(12) United States Patent
Goto et al.

(10) Patent No.: US 11,809,330 B2
(45) Date of Patent: Nov. 7, 2023

(54) INFORMATION PROCESSING APPARATUS AND METHOD

(71) Applicant: KIOXIA CORPORATION, Tokyo (JP)

(72) Inventors: Masataka Goto, Yokohama Kanagawa (JP); Kohei Okuda, Tokyo (JP); Takahiro Kurita, Sagamihara Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/685,962

(22) Filed: Mar. 3, 2022

(65) Prior Publication Data
US 2022/0398201 A1    Dec. 15, 2022

(30) Foreign Application Priority Data

Jun. 10, 2021    (JP) .................................. 2021-097175

(51) Int. Cl.
| | | |
|---|---|---|
| *G06F 3/06* | (2006.01) | |
| *G06F 12/1027* | (2016.01) | |
| *G06F 12/0891* | (2016.01) | |

(52) U.S. Cl.
CPC .......... *G06F 12/1027* (2013.01); *G06F 3/061* (2013.01); *G06F 3/067* (2013.01); *G06F 3/0656* (2013.01); *G06F 12/0891* (2013.01); *G06F 2212/1021* (2013.01); *G06F 2212/163* (2013.01)

(58) Field of Classification Search
CPC .. G06F 12/1027; G06F 12/0891; G06F 3/061; G06F 3/0656; G06F 3/067

USPC .................................................. 711/147, 118
See application file for complete search history.

(56) References Cited

U.S. PATENT DOCUMENTS

| | | | |
|---|---|---|---|
| 8,438,215 B2 | 5/2013 | Fujihira et al. | |
| 9,519,614 B2 | 12/2016 | Khakpour et al. | |
| 2005/0120058 A1* | 6/2005 | Nishio | .................. G06F 16/185 |
| 2009/0113068 A1* | 4/2009 | Fujihira | .................. H04L 63/08 |
| | | | 709/231 |
| 2013/0227051 A1* | 8/2013 | Khakpour | .......... H04N 21/2408 |
| | | | 709/213 |
| 2015/0378604 A1* | 12/2015 | Kawakami | .......... G06F 13/4022 |
| | | | 710/5 |

FOREIGN PATENT DOCUMENTS

| | | | |
|---|---|---|---|
| JP | 5261785 B2 | 8/2013 | |
| JP | 5764100 B2 | 8/2015 | |

* cited by examiner

*Primary Examiner* — Than Nguyen
(74) *Attorney, Agent, or Firm* — Kim & Stewart LLP

(57) ABSTRACT

An information processing apparatus includes a network interface, a storage device, and a processor. The processor is configured to assign a plurality of zones in the storage device. Each of the zones is a contiguous physical address range of the storage device that is mapped to a contiguous logical address range. The processor is configured to generate zone management information for each of the plurality of zones, store content received from the origin server via the network interface, in one of writable zones and update a writable address of the zone management information for the one of the writable zones. The processor is configured to operate to transmit the received content, and control the storage device to delete data stored therein in units of a zone upon a predetermined cache clearing criteria being met.

20 Claims, 24 Drawing Sheets

| HASH VALUE | ZONE | OFFSET (bytes) | SIZE (bytes) |
|---|---|---|---|
| "0c4a3ef006e375ebe5ef9dda83e7dbf2" | ZONE #0 | 0x0 | 12567 |
| "a6e38b2016de1ab75470fa601b542c7f" | ZONE #3 | 0x6372 | 1627846 |
| ⋮ | ⋮ | ⋮ | ⋮ |

INFORMATION PROCESSING APPARATUS AND METHOD

CROSS-REFERENCE TO RELATED APPLICATION(S)

This application is based upon and claims the benefit of priority from Japanese Patent Application No. 2021-097175, filed Jun. 10, 2021, the entire contents of which are incorporated herein by reference.

FIELD

Embodiments described herein relate generally to an information processing apparatus and a method.

BACKGROUND

As a network system, a network system having a configuration in which an information processing apparatus serving as a cache server is disposed at a location close to a terminal of an end user is known. Instead of a distribution server, the cache server responds to a content request from the terminal. For example, a content delivery network (CDN) is an example of such a network system. In such a network system, when the number or type of the distribution servers increases, a cache hit rate tends to decrease. The cache hit rate may be improved by increasing the storage capacity of the cache server with cost.

DETAILED DESCRIPTION

Embodiments provide an information processing apparatus that is inexpensive and has a large storage capacity, and a method of controlling the corresponding information processing apparatus.

In general, according to an embodiment, an information processing apparatus includes a network interface connectable to an origin server and a terminal via one or more networks, a storage device, and a processor. The processor is configured to assign a plurality of zones in the storage device, each of the zones being a contiguous physical address range of the storage device that is mapped to a contiguous logical address range and having a size greater than a unit size of data erasing in the storage device, generate zone management information for each of the plurality of zones, the zone management information including a writable address, which is a smallest address from which data can be written and information as to whether the zone is a writable zone, store content received from the origin server via the network interface, in one of writable zones and update the writable address of the zone management information for the one of the writable zones, control the network interface to transmit the received content to the terminal, and control the storage device to delete data stored therein in units of a zone upon a predetermined cache clearing criteria being met for one or more of the assigned zones.

An information processing apparatus according to embodiments is applicable to any computer configured to cache content. Hereinafter, descriptions will be made on an example in which the information processing apparatus according to embodiments is applied to a cache server in the CDN. Hereinafter, the cache server to which the information processing apparatus according to embodiments is applied will be described in detail with reference to accompanying drawings. The present disclosure is not limited by these embodiments.

First Embodiment

Figure 1:
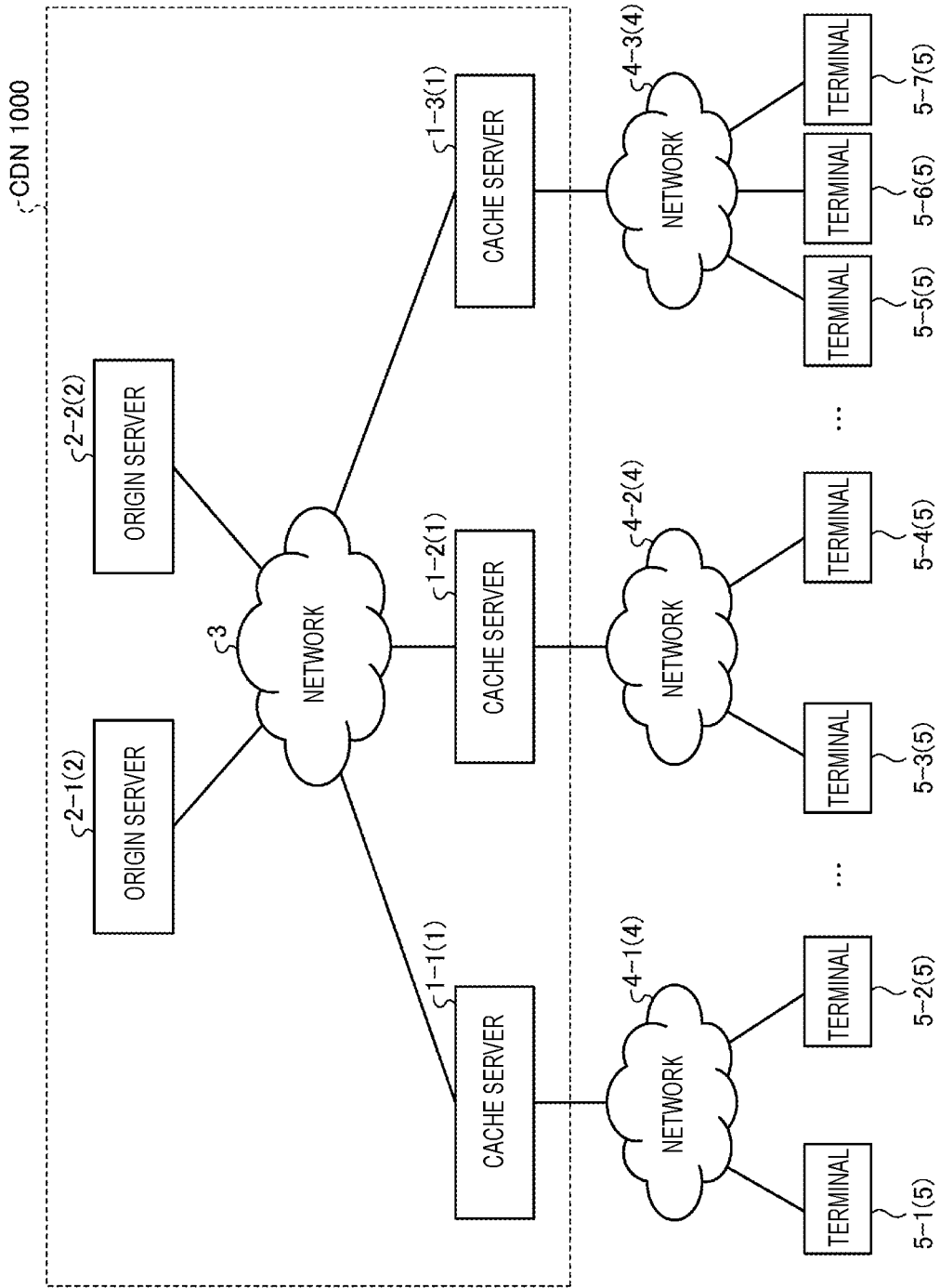
FIG. 1 is a schematic diagram illustrating an example of a content delivery network (CDN) including a cache server according to a first embodiment.

FIG. 1 is a schematic diagram illustrating an example of a CDN including a cache server according to a first embodiment. A CDN 1000 includes one or more cache servers 1, and one or more origin servers 2. In FIG. 1, as examples of one or more origin servers 2, two origin servers 2-1 and 2-2 are illustrated. As examples of one or more cache servers 1, three cache servers 1-1, 1-2, and 1-3 are illustrated. The two origin servers 2-1 and 2-2 and the three cache servers 1-1, 1-2, and 1-3 are connected via a network 3.

Each origin server 2 is a distribution server that distributes content. The content is video, images, or any other type of data. The content may be divided into a plurality of data chunks. The content distributed by the origin server 2 may be expressed as content of the origin server 2. Hereinafter, in some cases, content or data chunks may be collectively referred to as content or data.

Each cache server 1 is an example of an information processing apparatus according to the first embodiment. Each cache server 1 caches content distributed from one or more origin servers 2. Each cache server 1 may cache content of only one origin server 2, or may cache content of two or more origin servers 2. Further, caching content may be paraphrased as storing content or writing content.

When a request for content is received from a terminal 5 of an end user, the cache server 1 determines whether the requested content is cached in the cache server 1 itself. When the requested content is cached in the cache server 1 itself, the cache server 1 sends a response of the content to the terminal 5. When the requested content is not cached in the cache server 1 itself, each cache server 1 acquires the corresponding content from the origin server 2 as a distribution source of the requested content, and sends a response of the acquired content to the terminal 5 while caching the acquired content in the cache server 1 itself. Finding out that the requested content is cached in the cache server 1 is also referred to as cache hit. Finding out that the requested content is not cached in the cache server 1 is also referred to as cache miss.

In the example illustrated in FIG. 1, the cache server 1-1 is disposed in a network 4-1 to which terminals 5-1 and 5-2 as examples of the terminals 5 are connected. That is, the cache server 1-1 is disposed at a location close to the terminals 5-1 and 5-2. Accordingly, the cache server 1-1 is able to receive a content request transmitted from the terminals 5-1 and 5-2 via the network 4-1. Further, "close" means that a communication path is short, or communication may be performed in a short time.

The cache server 1-2 is disposed in a network 4-2 to which terminals 5-3 and 5-4 as examples of the terminals 5 are connected. That is, the cache server 1-2 is disposed at a location close to the terminals 5-3 and 5-4. Accordingly, the cache server 1-2 is able to receive a content request transmitted from the terminals 5-3 and 5-4 via the network 4-2.

The cache server 1-3 is disposed in a network 4-3 to which terminals 5-5, 5-6, and 5-7 as examples of the terminals 5 are connected. That is, the cache server 1-3 is disposed at a location close to the terminals 5-5, 5-6, and 5-7. Accordingly, the cache server 1-3 is able to receive a content request transmitted from the terminals 5-5, 5-6, and 5-7 via the network 4-3.

In the CDN 1000, when a request for content is transmitted from the terminal 5, and a cache hit occurs in the cache server 1 close to the terminal 5 as a sender of the corresponding request, the corresponding cache server 1 responds to the corresponding request, instead of the origin server 2 as the corresponding content distribution source. Therefore, concentration of accesses to the origin server 2 may be reduced. Each terminal 5 may acquire desired content in a short time. These effects obtained when the cache hit occurs in the cache server 1 may be referred to as a cache effect in some cases.

Figure 2:
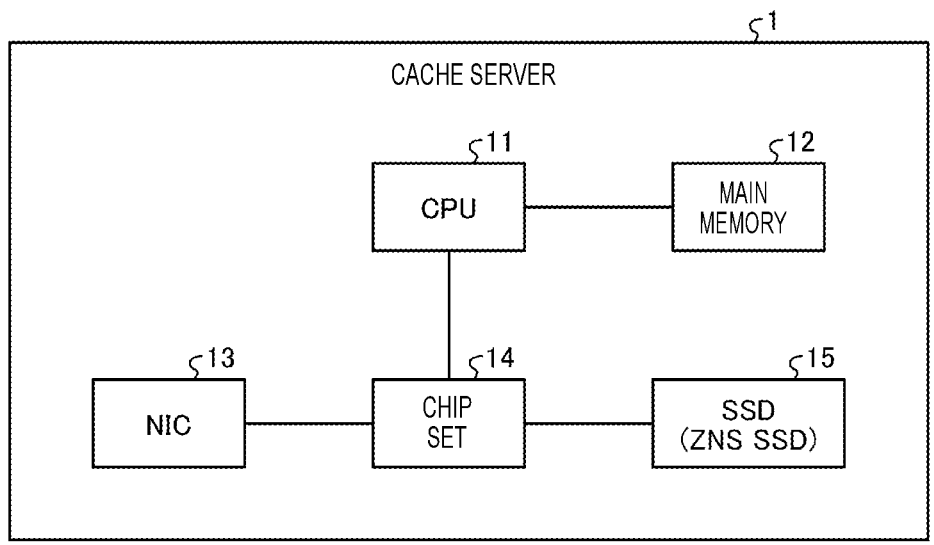
FIG. 2 is a schematic diagram illustrating an example of a hardware configuration of the cache server according to the first embodiment.

FIG. 2 is a schematic diagram illustrating an example of a hardware configuration of the cache server 1 according to the first embodiment. The cache server 1 includes a central processing unit (CPU) 11, a main memory 12, a network interface card (NIC) 13, a chipset 14, and a solid state drive (SSD) 15. The main memory 12 is electrically connected to the CPU 11. The CPU 11, the NIC 13, and the SSD 15 are electrically connected to the chipset 14. Further, a connection relationship between individual elements is not limited to this manner.

The SSD 15 is an example of a storage device in the first embodiment. Content is stored as cache data in the SSD 15. In the first embodiment, the SSD 15 is an SSD of a type called a zoned namespace (ZNS) SSD. The ZNS SSD is an SSD that is able to execute each command included in a ZNS command set defined by NVM Express™. The function of the SSD 15 as the ZNS SSD will be described below.

The CPU 11 is a processor capable of executing a computer program (hereinafter, referred to as a program or software). The CPU 11 implements the control of the entire operation of the cache server 1 by executing a predetermined program. The CPU 11 is able to control operations of the SSD 15 by transmitting various commands such as a write command, a read command, or each command included in the ZNS command set, to the SSD 15.

The main memory 12 functions as an area in which a program is loaded, or an area in which data is temporarily stored.

The chipset 14 executes transmission/reception of information between the CPU 11, the NIC 13, and the SSD 15.

The NIC 13 is an interface device. The cache server 1 uses the NIC 13 to execute transmission/reception of information to/from the origin server 2 or the terminal 5 via networks (e.g., the network 3 and the network 4).

Figure 3:
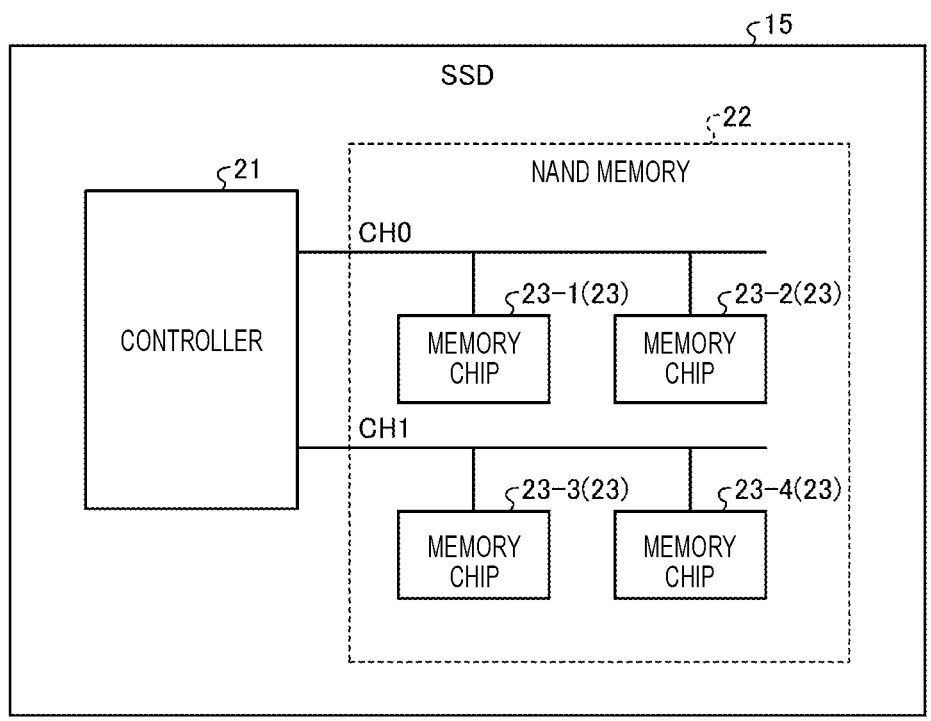
FIG. 3 is a schematic diagram illustrating an example of a hardware configuration of a solid state drive (SSD) in the cache server according to the first embodiment.

FIG. 3 is a schematic diagram illustrating an example of a hardware configuration of the SSD 15 in the cache server 1 according to the first embodiment. The SSD 15 includes a controller 21 and a NAND memory 22.

The controller 21 writes data received from a host into the NAND memory 22 according to a write command from the host. The controller 21 reads data from the NAND memory 22 and transmits the data to a host, according to a read command from the host. Further, in the first embodiment, the CPU 11 corresponds to a host in the controller 21.

The controller 21 is able to execute each command included in the ZNS command set.

The NAND memory 22 includes one or more memory chips 23. In the example illustrated in FIG. 3, the NAND memory 22 includes four memory chips 23-1, 23-2, 23-3, and 23-4. Each memory chip 23 is, for example, a memory chip of a NAND type flash memory.

The memory chip 23-1 and the memory chip 23-2 are connected to the controller 21 via a channel CH0. The memory chip 23-3 and the memory chip 23-4 are connected to the controller 21 via a channel CH1. Each of the channels CH0 and CH1 includes a signal line group capable of transmitting commands, addresses, data, and control signals.

The number of memory chips 23 that make up the NAND memory 22 is not limited to four. The connection relationship between each memory chip 23 and the controller 21 is not limited to the above relationship.

Figure 4:
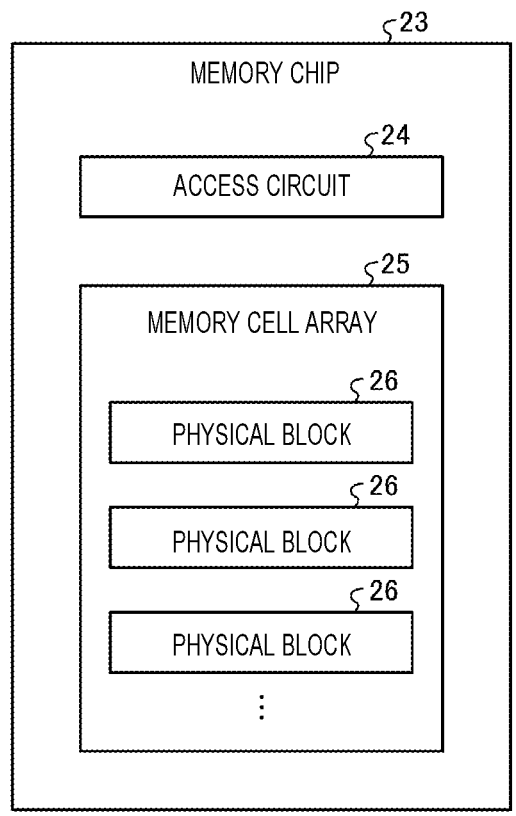
FIG. 4 is a schematic diagram illustrating an example of a hardware configuration of a memory chip in the SSD in FIG. 3.

FIG. 4 is a schematic diagram illustrating an example of a hardware configuration of the memory chip 23 in the first embodiment. The memory chip 23 includes an access circuit 24 and a memory cell array 25.

The access circuit 24 includes a row decoder, a column decoder, a sense amplifier, a voltage generation circuit, a sequencer, a data buffer, etc. The access circuit 24 executes writing of data, reading of data, and erasure of data, to/from the memory cell array 25.

The memory cell array 25 includes a configuration in which memory cells are two-dimensionally or three-dimensionally arranged. The memory cell array 25 includes a plurality of physical blocks 26. The physical block 26 is a unit of erasure for the memory cell array 25. That is, all data pieces stored in one physical block 26 are collectively erased by the access circuit 24.

Each physical block 26 has a plurality of pages. Each page is the smallest unit in units of which the access circuit 24 can write data and read data.

The memory cell array 25 may be divided into planes each of which has a plurality of physical blocks. The planes have peripheral circuits (e.g., a row decoder, a column decoder, etc.) that are independent from each other, respectively, and thus, it is possible to execute writing, reading, or erasing for the plurality of planes at the same time.

The controller 21 may set a plurality of logical blocks. Each logical block includes, for example, physical blocks belonging to different memory chips 23 or different planes, respectively. The controller 21 may instruct the physical blocks that make up one logical block to perform writing, reading, or erasing at the same time.

Hereinafter, it is assumed that a block means the physical block 26 or the logical block.

Subsequently, the function of the SSD 15 as the ZNS SSD will be described. The SSD 15 as the ZNS SSD is configured to be able to interpret and execute each command included in the ZNS command set. The ZNS command set includes a zone create command. The zone create command is a command for creating a zone.

Figure 5:
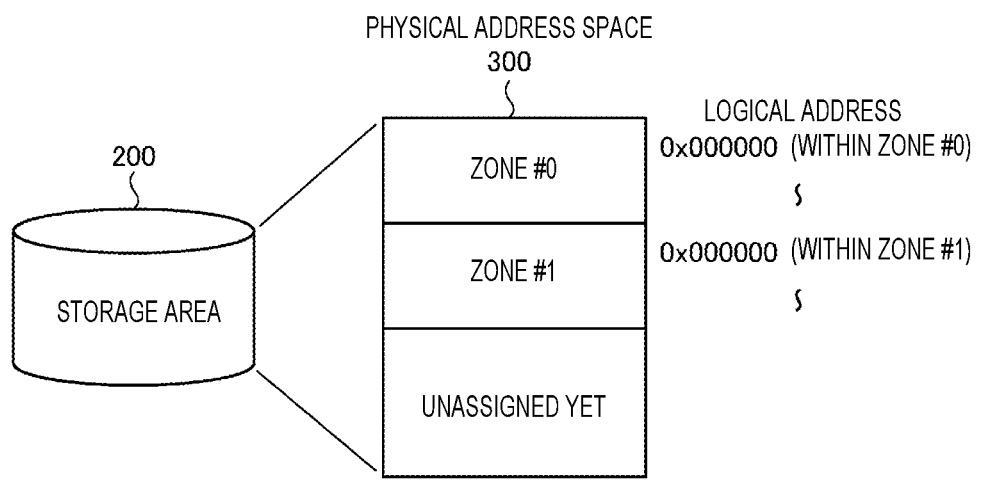
FIG. 5 is a schematic diagram illustrating a zone in the first embodiment.

FIG. 5 is a schematic diagram illustrating a zone in the first embodiment.

A group of blocks for four memory chips 23 in the SSD 15 makes up a storage area 200. Then, the storage area 200 is mapped to a physical address space 300. The physical address space 300 indicates a range including consecutive physical address values given to the storage area 200. More specifically, a physical address value, which is location information based on structural characteristics of the memory cell array 25, is assigned to each location in the memory cell array 25. For example, consecutive physical address values are assigned to a plurality of clusters included in one page. Then, consecutive physical address values, with sizes corresponding to page sizes, are assigned to a plurality of pages included in one block. The cluster is the smallest size area given a physical address value, and is smaller than a page. The controller 21 uses the physical address values to instruct each memory chip 23 to perform writing, reading, and erasing. Further, the storage area 200 and the physical address space 300 are an example of a first storage area.

The correspondence between a physical address value and a location in the memory cell array 25 is basically fixed. There may be an exception in fixing the correspondence between the physical address value and the location in the memory cell array 25. For example, when an access to one block becomes difficult, the controller 21 may reassign a group of physical address values, which was assigned to the block that becomes difficult to access (i.e., write, read, or erase), to another spare block.

When a zone create command is received from the host, the controller 21 creates a zone in the physical address space 300 (i.e., the storage area 200). Creating a zone in the physical address space 300 is assigning a contiguous area in the physical address space 300, to one zone. The contiguous area is an area that is not fragmented into a plurality of areas. In the example illustrated in FIG. 5, a head area of the physical address space 300 is assigned to a zone #0, and an area adjacent to the end of the zone #0 is assigned to a zone #1. An area adjacent to the end of the zone #1 is not yet assigned to any zone.

In this manner, in the physical address space 300, a plurality of zones are created by the control from the host (i.e., the CPU 11). In the plurality of corresponding zones, one or more contents distributed from the origin server 2 are stored as cache data. Each zone is an example of a second storage area.

One zone may include a plurality of blocks. Then, a logical address is associated with each location (i.e., each cluster) in one zone such that a group of consecutive logical address values linearly corresponds to a group of consecutive physical addresses in one zone. For example, consecutive logical address values starting from a logical address value "0x000000" are associated with clusters, respectively, from the head to the end of the area to which the zone #0 is assigned, in the physical address space 300. Consecutive logical address values starting from a logical address value "0x000000" are associated with clusters, respectively, from the head to the end of the area to which the zone #1 is assigned, in the physical address space 300.

Figure 6:
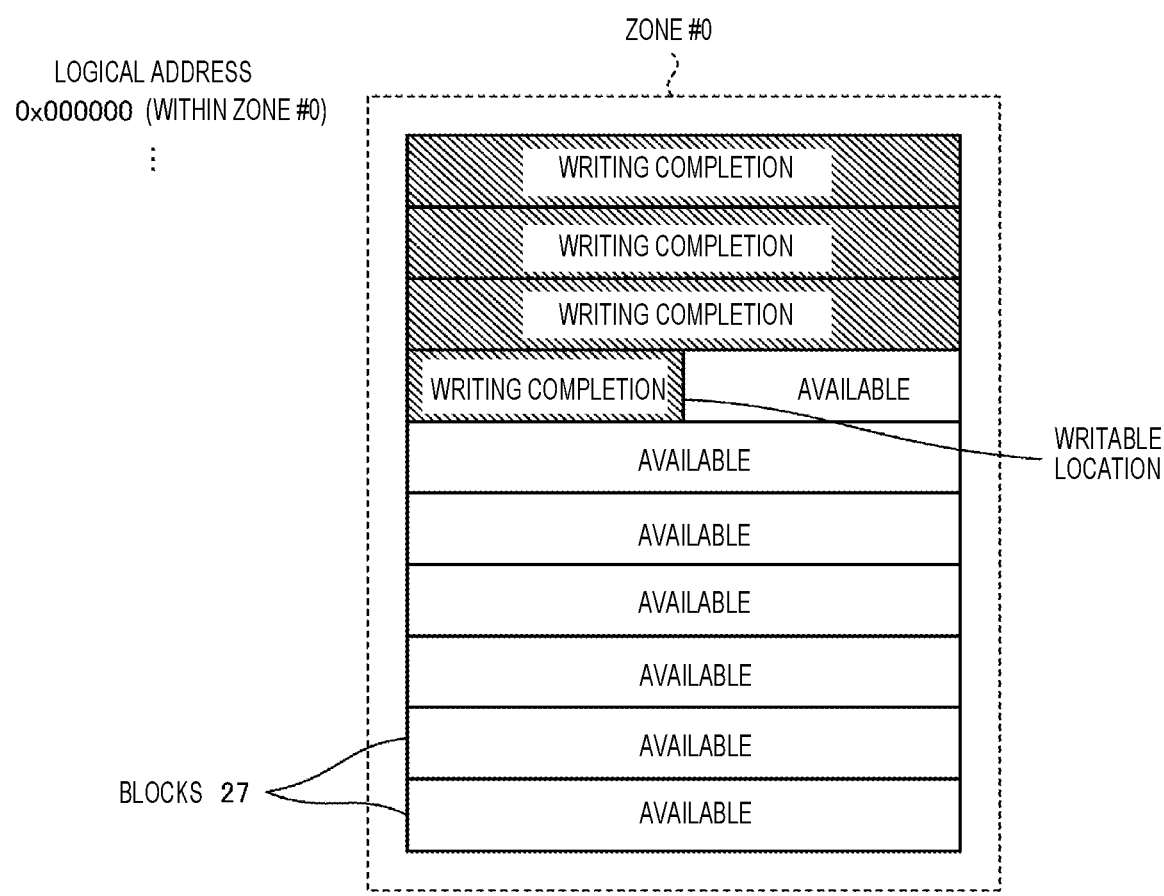
FIG. 6 is a schematic diagram illustrating restrictions regarding a zone namespace (ZNS) SSD applied as the SSD in the cache server according to the first embodiment.

In the ZNS SSD, restrictions are set regarding writing of data and erasure of data. FIG. 6 is a schematic diagram illustrating restrictions regarding the ZNS SSD applied as the SSD 15 in the first embodiment. Further, in FIG. 6, as an example, an area assigned to the zone #0 in the physical address space 300 is illustrated. In the example illustrated in FIG. 6, the zone #0 includes ten blocks 27. Each block 27 is the physical block 26 or the logical block.

In the ZNS SSD, the host is required to sequentially perform writing on each zone, in order of logical address. For example, in regard to the zone #0, the host selects write destinations in the order of logical address values from, at the head, the location indicated by the logical address value "0x000000", and sequentially writes data. Further, writing data by the host is that the host transmits a write command, a logical address value indicating a write destination, and write target data, to the SSD (the ZNS SSD in this case).

As described above, a logical address value is associated with each location in one zone such that a group of consecutive logical address values linearly corresponds to a group of consecutive physical addresses in one zone. Therefore, when the host is subject to a restriction that writing is sequentially performed in order of logical address, the controller 21 sequentially writes data on each zone in order of physical address. For example, in the case of the zone #0, the controller 21 sequentially writes data sequentially received from the host such that physical address values of write destinations are continuous from the block 27 to which the smallest physical address value is assigned in the zone #0. When writing on one block 27 in the zone #0 is completed, that is, when there is no available area in the corresponding block 27, the controller 21 writes subsequently received data into a subsequent block 27 in order of physical address in the zone #0. Further, the available area is an area in which no data is stored and may be referred to as a vacant area or vacancy.

Specifically, the host performs the management to be described below so as to sequentially write data in order of logical address. That is, the host manages a location subsequent to an area on which writing has been lastly completed in one zone, in order of logical address value, as a writable location for next data. That is, in one zone, a head location of an available area is managed as a writable location for next data. Hereinafter, the writable location for next data, which is managed by the host, will be referred to as a writable location. The host writes new data into a location set as a writable location, in each zone. The host does not write data into any location other than the location set as the writable location, in each zone. Through the above management, the host may sequentially write data into each zone, in order of logical address.

In the management in the host, the setting of the writable location may be aligned with a boundary of predetermined unit areas. The predetermined unit area is, for example, a sector, a cluster, a page or the like. The sector is the smallest size area given a logical address value, and is smaller than a cluster.

In the ZNS SSD, there is a further restriction that data erasure is executed on a zone by zone basis. For example, in the case of the zone #0, the host and the controller 21 perform a control to collectively erase data in the ten blocks 27 that make up the zone #0. For example, in the case of the zone #0, neither the host nor the controller 21 executes a control such that erasure is performed on only some of the ten blocks 27 that make up the zone #0 while leaving data of the other blocks 27. The host instructs the SSD 15 to delete data in the zone #0. The controller 21 of the SSD 15 targets the ten blocks 27 that make up the zone #0, and instructs all the memory chips 23 having the target blocks 27 to perform erasure.

After data erasure is executed for one zone, in the zone, data writing becomes possible from the head in order of logical address (and in order of physical address).

In this manner, in the ZNS SSD, there are restrictions that data has to be sequentially written in order of logical address in each zone, and data erasure has to be executed on a zone by zone basis.

Here, a comparative SSD of the SSD 15 in the first embodiment will be described. The comparative SSD will be referred to as an SSD related to a comparative example.

The SSD of the comparative example has a configuration in which random writing, that is, logical address-based random writing, is possible for the purpose of maintaining compatibility with a magnetic disk device. Thus, the SSD of the comparative example records the correspondence between a logical address value and a physical address value, in logical-to-physical address translation information, for each cluster, and performs management. The SSD of the comparative example searches the logical-to-physical address translation information at the time of reading, and updates the logical-to-physical address translation information at the time of writing. In the SSD of the comparative example, since the unit of recording of the correspondence between the logical address value and the physical address value is a cluster unit, the larger the capacity of a NAND memory, the larger the size of the logical-to-physical address translation information. As a result, in order to speed up the search of the logical-to-physical address translation information, a large-capacity buffer memory is required, or it is required to allocate a large area for saving the logical-to-physical address translation information, in the storage area of the NAND memory.

The SSD of the comparative example has a configuration in which overwriting is possible in a logical address space. Overwriting in the logical address space is a process of writing new data into a location in the logical address space indicated by a certain logical address value, in a state where old data is written in the corresponding location. Hereinafter, overwriting in the logical address space will be simply referred to as overwriting. At the time of overwriting, the SSD of the comparative example writes new data into an available area of the NAND memory and manages the corresponding new data as valid data, and then invalidates old data that is already stored in another location in the NAND memory. Through this process, as the amount of overwritten data increases, the amount of invalid data in the NAND memory increases. When the amount of invalid data increases and free blocks are spent, the SSD of the comparative example executes garbage collection (compaction) so as to generate free blocks. A free block is a block in which no valid data is stored. The garbage collection is a process in which one block storing valid data is selected, and the valid data stored in the selected block is copied to another block so that the selected block is placed in a state where no valid data is stored (i.e., a free block state). All data pieces stored in the block placed in the free block state are erased at once, and thus, all storage areas in the corresponding block become available areas.

The size of the logical address space provided by the SSD to the host is called a user capacity. According to the SSD of the comparative example, the user capacity is equal to the maximum amount of valid data that may be stored in the NAND memory. According to the SSD of the comparative example, overwriting invalidates old data in the NAND memory. Therefore, in order to enable continuous writing, the SSD of the comparative example needs a storage area having a capacity exceeding the user capacity. A capacity corresponding to an excess over the user capacity is referred to as an over-provisioning capacity. In a state where valid data for the user capacity is written, the SSD of the comparative example may store invalid data up to an amount obtained by subtracting an amount corresponding to a minimum number of free blocks from the over-provisioning capacity. When the number of free blocks is less than the minimum number, the SSD of the comparative example executes the above described garbage collection.

The ratio of the over-provisioning capacity to the user capacity affects the execution frequency of garbage collection. As the ratio of the over-provisioning capacity to the user capacity gets smaller, garbage collection needs to be more frequently executed. When the garbage collection is executed, hardware (e.g., a bus, a processor or the like) in the SSD needs to significantly dedicate for the garbage collection. Thus, a response performance to the host is decreased. Therefore, according to the SSD of the comparative example, as the required performance gets higher, the ratio of the over-provisioning capacity to the user capacity needs to be increased. According to the SSD of the comparative example, in using the user capacity while maintaining the high performance, a large over-provisioning capacity is required in addition to the user capacity.

As described above, according to the SSD of the comparative example, as the user capacity gets larger, resources required to manage the logical-to-physical address translation information increase or a large over-provisioning capacity is required. Therefore, according to the SSD of the comparative example, it is difficult in terms of cost to increase the user capacity while maintaining the performance.

When the SSD of the comparative example is employed in a cache server, the user capacity is the maximum amount (i.e., a storage capacity) by which content may be cached. Therefore, when the SSD of the comparative example is employed in the cache server, it is necessary to increase the number of memory chips to be mounted in the SSD in order to increase the storage capacity, and thus it is difficult to increase the storage capacity at low cost.

In contrast, the ZNS SSD is employed as the SSD 15 in the first embodiment. A controller of the ZNS SSD associates logical address value with each location in one zone such that a group of consecutive logical address values linearly corresponds to a group of consecutive physical addresses in one zone. Therefore, when the correspondence between a logical address and a physical address is recorded as logical-to-physical address translation information only for a head location of a zone, the controller of the ZNS SSD may derive the correspondence between the logical address value and the physical address value of each location in the zone. Therefore, as compared to in the SSD of the comparative example, in the ZNS SSD, it is possible to significantly reduce the amount of resources required for managing the logical-to-physical address translation information.

In the ZNS SSD, there are restrictions that data has to be sequentially written in order of logical address in each zone, and data erasure has to be executed on a zone by zone basis. Therefore, in the ZNS SSD, invalid data is not generated, and garbage collection is not needed. That is, there is no performance degradation caused by execution of garbage collection. Since invalid data is not generated, an over-provisioning capacity is not required. Therefore, as compared to in the SSD of the comparative example, in the ZNS SSD, it is easy to increase a user capacity at low cost while maintaining the performance.

In the first embodiment, by utilizing the ZNS SSD instead of the SSD of the comparative example, it becomes possible to implement a cache server having a large storage capacity, at low cost.

The cache server 1 caches content in the SSD 15. More specifically, the cache server 1 creates a plurality of zones in the storage area 200 of the SSD 15, and caches one or more contents in the plurality of created zones. The content cached in the SSD 15 may be referred to as cache data.

Figure 7:
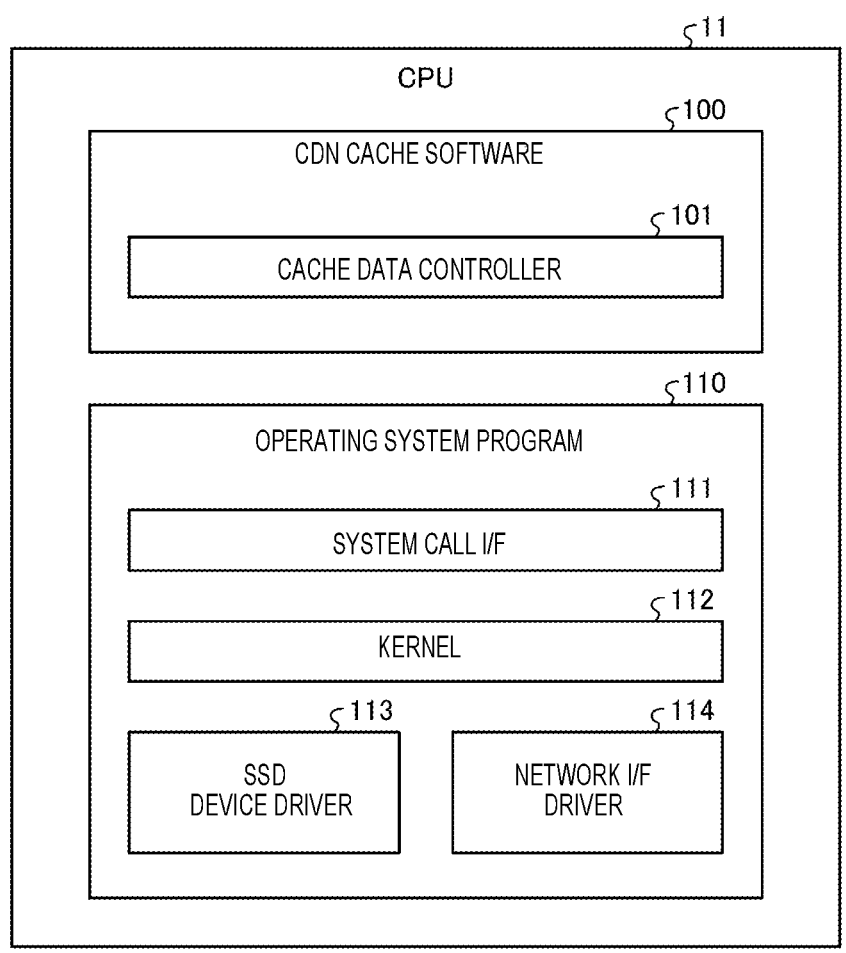
FIG. 7 is a schematic diagram illustrating an example of a software configuration of the cache server according to the first embodiment.

FIG. 7 is a schematic diagram illustrating an example of a software configuration of the cache server 1 according to the first embodiment. In the cache server 1, the CPU 11 executes CDN cache software 100 and an operating system program 110. Specifically, the CPU 11 acquires the operating system program 110 and the CDN cache software 100 from a predetermined location and loads these into the main memory 12. The predetermined location may be the SSD 15, or may be another device connected to the cache server 1 via a network.

The CPU 11 functions as a system call interface (I/F) 111, a kernel 112, an SSD device driver 113, and a network interface (I/F) driver 114 by executing the operating system program 110 loaded in the main memory 12. The CPU 11 implements the function as a cache data controller 101 by executing the CDN cache software 100 loaded in the main memory 12.

The system call interface 111 is an interface that receives a call for the function of the kernel 112 from an application (the CDN cache software 100 in this case). The SSD device driver 113 is a driver for using the SSD 15 that is a ZNS SSD. The network interface driver 114 is a driver for using the NIC 13.

The kernel 112 manages hardware resources of the cache server 1 so as to allow the application to use the hardware resources of the cache server 1. When a call from the application is received via the system call interface 111, the kernel 112 allows the application to use the functions such as the SSD device driver 113 or the network interface driver 114. This allows the application to use the hardware resources of the cache server 1.

The cache data controller 101 controls the operation as the cache server 1.

Figures 8, 9:
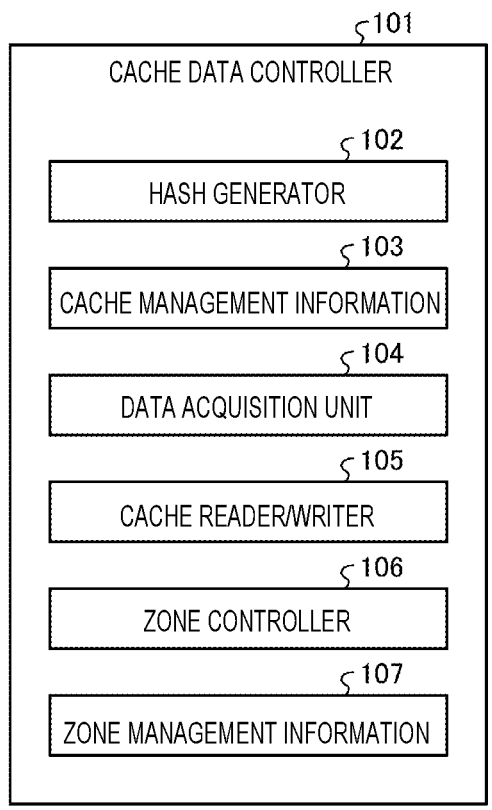
FIG. 8 is a schematic diagram illustrating an example of a more detailed functional configuration of a cache data controller implemented in the cache server according to the first embodiment.
FIG. 9 is a schematic diagram illustrating an example of a data structure of cache management information in the first embodiment.

FIG. 8 is a schematic diagram illustrating an example of a more detailed functional configuration of the cache data controller 101 in the first embodiment. The cache data controller 101 includes a hash generator 102, cache management information 103, a data acquisition unit 104, a cache reader/writer 105, a zone controller 106, and zone management information 107. The hash generator 102, the data acquisition unit 104, the cache reader/writer 105, and the zone controller 106 are implemented by, for example, the CPU 11. The cache management information 103 and the zone management information 107 are stored in, for example, the main memory 12. In a case where the cache management information 103 and the zone management information 107 are stored in the main memory 12, when the power of the cache server 1 is turned off, the cache management information 103 and the zone management information 107 may be evacuated from the main memory 12 to a non-volatile storage device such as the SSD 15.

The hash generator 102 hashes identification information of content included in the content request from the terminal 5. More specifically, the request for the content includes, for example, a uniform resource locator (URL) as identification information of the corresponding content. The cache data controller 101 manages the content cached in the cache server 1 by using the hash of the URL.

The cache management information 103 is a table for managing data cached in the cache server 1.

FIG. 9 is a schematic diagram illustrating an example of a data structure of the cache management information 103 in the first embodiment. In the example illustrated in FIG. 9, the cache management information 103 is information in a table format in which a zone identification number, the offset from a head location of a zone, and a size are recorded for each hash value. The hash value is a value generated by the hash generator 102 from the URL as the identification information indicating content, and indicates the content stored as cache data in the SSD 15. The zone identification number indicates a zone in which the content is stored as cache data. The offset from the head location of the zone indicates a head location in a range where the content is stored as cache data. The size indicates a size of a range where the content is stored as cache data, and corresponds to the size of the content. Further, in the example illustrated in FIG. 9, the offset from the head location of the zone, and the size are expressed in bytes. However, the units in which the offset from the head location of the zone and the size are expressed are not limited thereto. A logical address value may be used as the offset from the head location of the zone. Hereinafter, information related to one content recorded in the cache management information 103 (i.e., the set including the zone identification number, the offset from the head location of the zone, and the size) will be referred to as an entry.

Referring back to FIG. 8, the data acquisition unit 104 acquires content from the origin server 2.

The cache reader/writer 105 writes the content acquired from the origin server 2 by the data acquisition unit 104, as cache data, into the SSD 15, or reads the content stored as cache data in the SSD 15, from the SSD 15.

Figure 10:
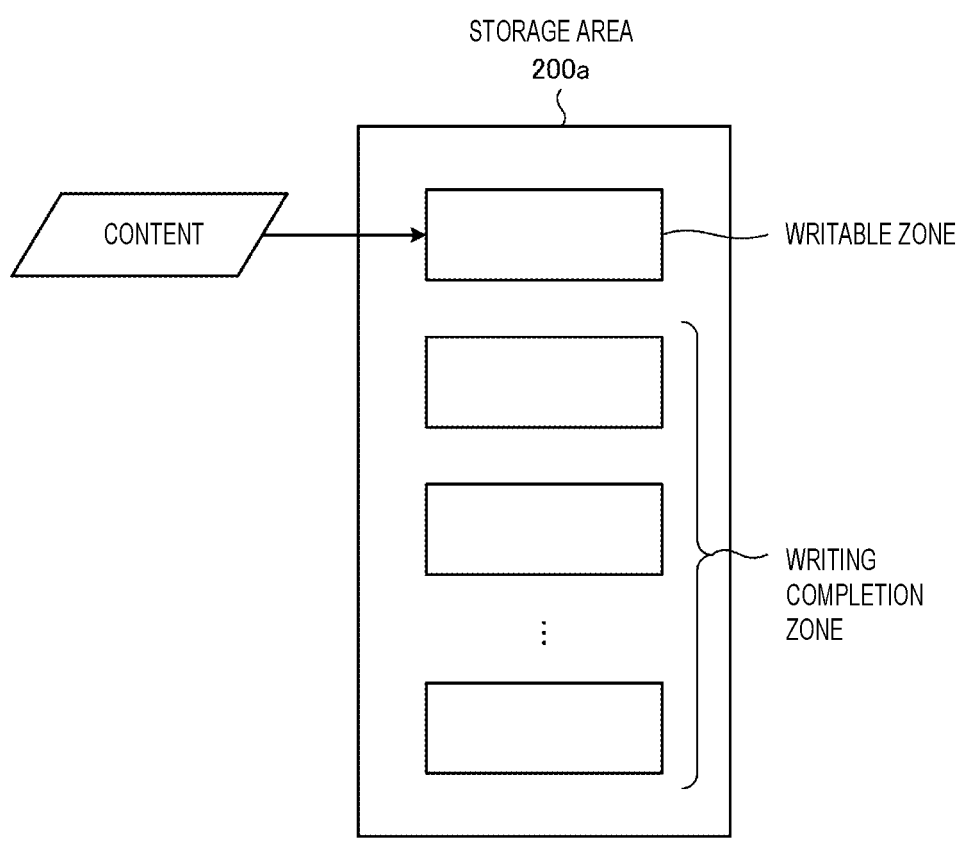
FIG. 10 is a schematic diagram illustrating a method of setting a writable zone in the first embodiment.

The number of zones in which content is writable may be freely set by a designer. The zone in which content is writable is referred to as a writable zone. In the first embodiment, as an example, as illustrated in FIG. 10, only one writable zone is set, and the cache reader/writer 105 writes content into the writable zone. When there is no available area in the writable zone, another zone is set as a new writable zone.

The zone controller 106 controls creation of a zone. The zone controller 106 manages the created zone by using the zone management information 107. The zone controller 106 controls deletion of a zone.

Figure 11:
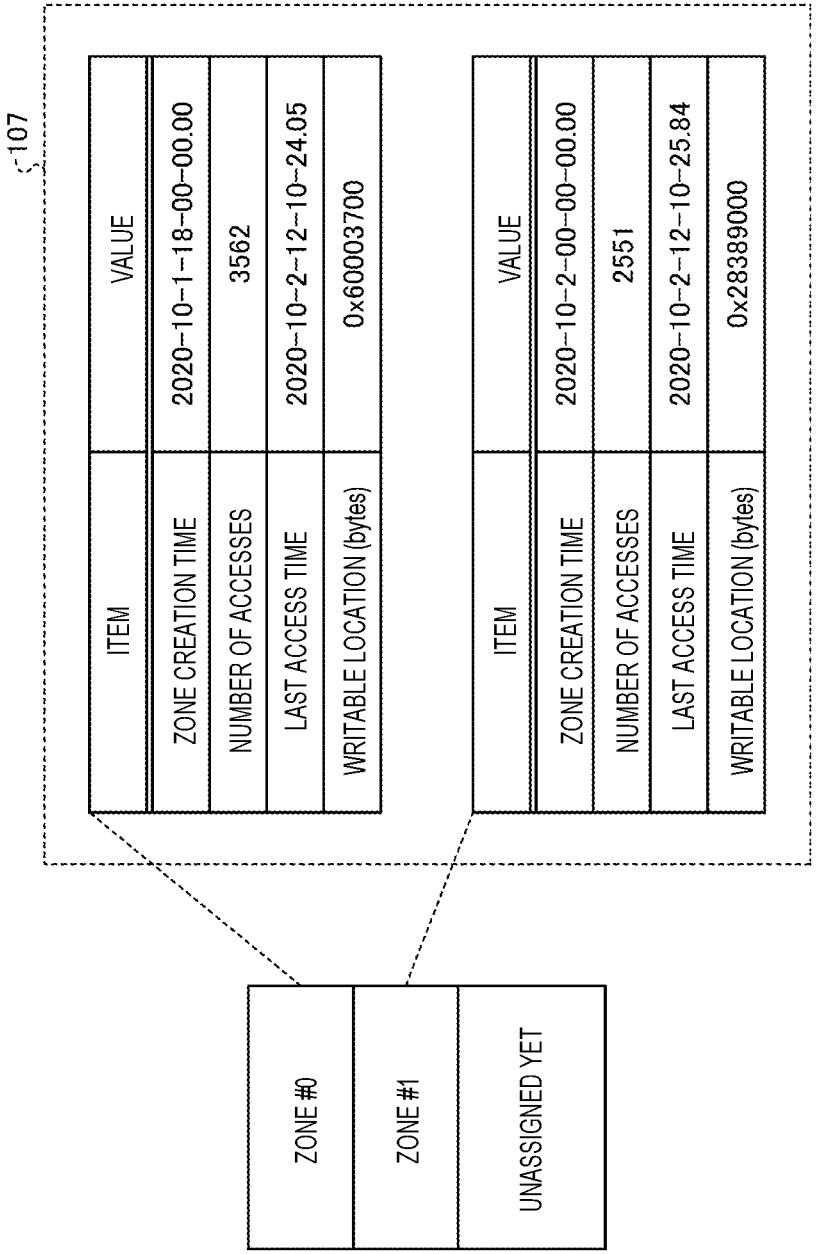
FIG. 11 is a schematic diagram illustrating an example of a data structure of zone management information in the first embodiment.

FIG. 11 is a schematic diagram illustrating an example of a data structure of the zone management information 107 in the first embodiment. The zone management information 107 is information on an access to each zone. In the example illustrated in FIG. 11, the information on the access includes a zone creation time (may be referred to as zone assigned time), the number of accesses, the last access time, and a writable location. The zone creation time indicates the time when a zone was created (i.e., assigned). The number of accesses indicates the number of times a zone is accessed after the corresponding zone was created. Further, in the description of FIG. 11, it is assumed that the access refers to only reading. The access may be both writing and reading. The last access time indicates the time of the last access. The writable location is expressed as an offset from a head location of a zone. The writable location may be expressed by a logical address value.

The size of the storage area 200 is limited. Therefore, the number of zones that may be created in the storage area 200 is limited. When a predetermined condition is satisfied, the zone controller 106 determines a deletion target zone on the basis of the zone management information 107, and performs a deletion control on the zone determined as the deletion target zone.

The zone controller 106 selects a deletion target zone in accordance with a predetermined policy on the basis of the zone management information 107 illustrated in FIG. 11. Various policies may be adopted as the policy for selecting a deletion target zone. Hereinafter, examples of the policies for selecting a deletion target zone, which may be referred to as cache clearing criteria) will be described.

(Policy 1) Select a zone with the oldest zone creation time as a deletion target among existing zones.

(Policy 2) Select a zone with the least number of accesses as a deletion target among existing zones.

(Policy 3) Select a zone having the longest elapsed time from the last access as a deletion target among existing zones.

By adding various information pieces to the zone management information 107, any policies other than the policies 1 to 3 may be adopted.

Figure 12:
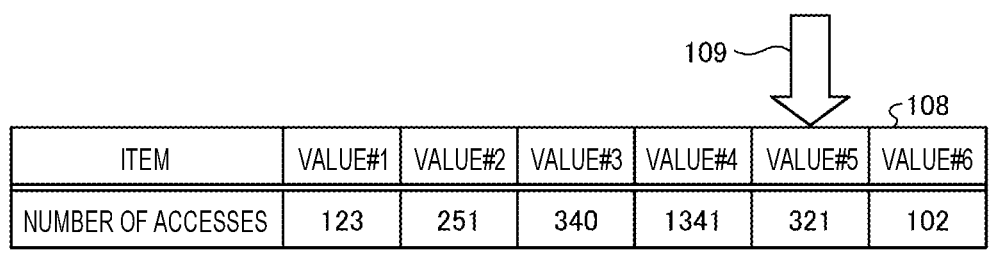
FIG. 12 is a schematic diagram illustrating an example of information to be added to the zone management information in the first embodiment.

FIG. 12 is a schematic diagram illustrating an example of information to be added to the zone management information 107 in the first embodiment. Information 108 illustrated in FIG. 12 has a ring buffer configuration in which the number of accesses is recorded in six separate steps. The zone controller 106 provides the information 108 for each zone. The zone controller 106 sequentially switches a recording destination of the number of accesses in the information 108, from the "value 1" field toward the "value 6" field every 5 minutes, and then switches the recording destination to the "value 1" field after the "value 6" field. In switching of the recording destination, the zone controller 106 initializes the field content of a new recording destination to zero. The field of the recording destination is designated by, for example, a pointer 109. Further, in the example illustrated in FIG. 12, the pointer 109 points to the "value 5" field. The zone controller 106 may count the number of accesses in the latest 30-min period with an accuracy of 5 minutes by summing up contents from the "value 1" field to the "value 6" field. Further, the time for switching the recording destination is not limited to 5 minutes. The number of fields as recording destinations included in the information 108 is not limited to six. The designer may freely set the time for switching the recording destination and the number of fields as recording destinations included in the information 108.

When the information 108 illustrated in FIG. 12 is added to the zone management information 107, the zone controller 106 may determine a deletion target zone in accordance with the following policy 4.

(Policy 4) Select a zone with the least number of accesses during the latest predetermined period, as a deletion target.

The condition that triggers the deletion of a zone may be freely set by the designer. In the first embodiment, it is assumed that the state where the total amount of cache data in the storage area 200 exceeds a predetermined threshold value is set as a trigger for zone deletion. Further, the condition that triggers the deletion of a zone is an example of a first condition.

The process of deleting a zone involves the process of deleting all cache data pieces in the zone. When the zone is deleted, some of cache data stored in a deletion target zone may be saved. That is, the cache reader/writer 105 may copy some cache data pieces to another zone prior to deletion of the deletion target zone so as to prevent some corresponding cache data pieces stored in the deletion target zone from being lost in the SSD 15.

Various policies may be adopted as the policy for selecting save target cache data. Hereinafter, examples of the policies for selecting save target cache data, which may be referred to as cache saving criteria) will be described.

(Policy 5) The cache reader/writer 105 records the number of times of reading for each cache data piece. When the number of times of reading satisfies a predetermined condition, the cache reader/writer 105 selects cache data for which the number of times of reading satisfies the corresponding predetermined condition, as a save target. The corresponding predetermined condition related to the number of times of reading is, for example, that the number of times of reading exceeds a fixed threshold value. In another example, the corresponding predetermined condition related to the number of times of reading is that the number of times of reading is ranked in the top predetermined percent in a deletion target zone. In another example, the corresponding predetermined condition related to the number of times of reading is that the number of times of reading is ranked in the top predetermined percent in all zones.

(Policy 6) The cache reader/writer 105 manages the number of times of reading for each cache data piece during the latest predetermined period. When the number of times of reading during the latest predetermined period satisfies the predetermined condition, the cache reader/writer 105 selects cache data for which the number of times of reading during the latest predetermined period satisfies a predetermined condition, as a save target. The corresponding predetermined condition related to the number of times of reading during the latest predetermined period is, for example, that the number of times of reading during the latest predetermined period exceeds a fixed threshold value. In another example, the corresponding predetermined condition related to the number of times of reading during the latest predetermined period is that the number of times of reading during the latest predetermined period is ranked in the top predetermined percent in a deletion target zone. In another example, the corresponding predetermined condition related to the number of times of reading during the latest predetermined period is that the number of times of reading during the latest predetermined period is ranked in the top predetermined percent in all zones.

For example, the cache reader/writer 105 may manage the number of times of reading for each cache data piece by using the same information as the information 108 illustrated in FIG. 12 so as to obtain the number of times of reading during the latest predetermined period.

Next, an operation of the cache server 1 according to the first embodiment will be described.

Figure 13:
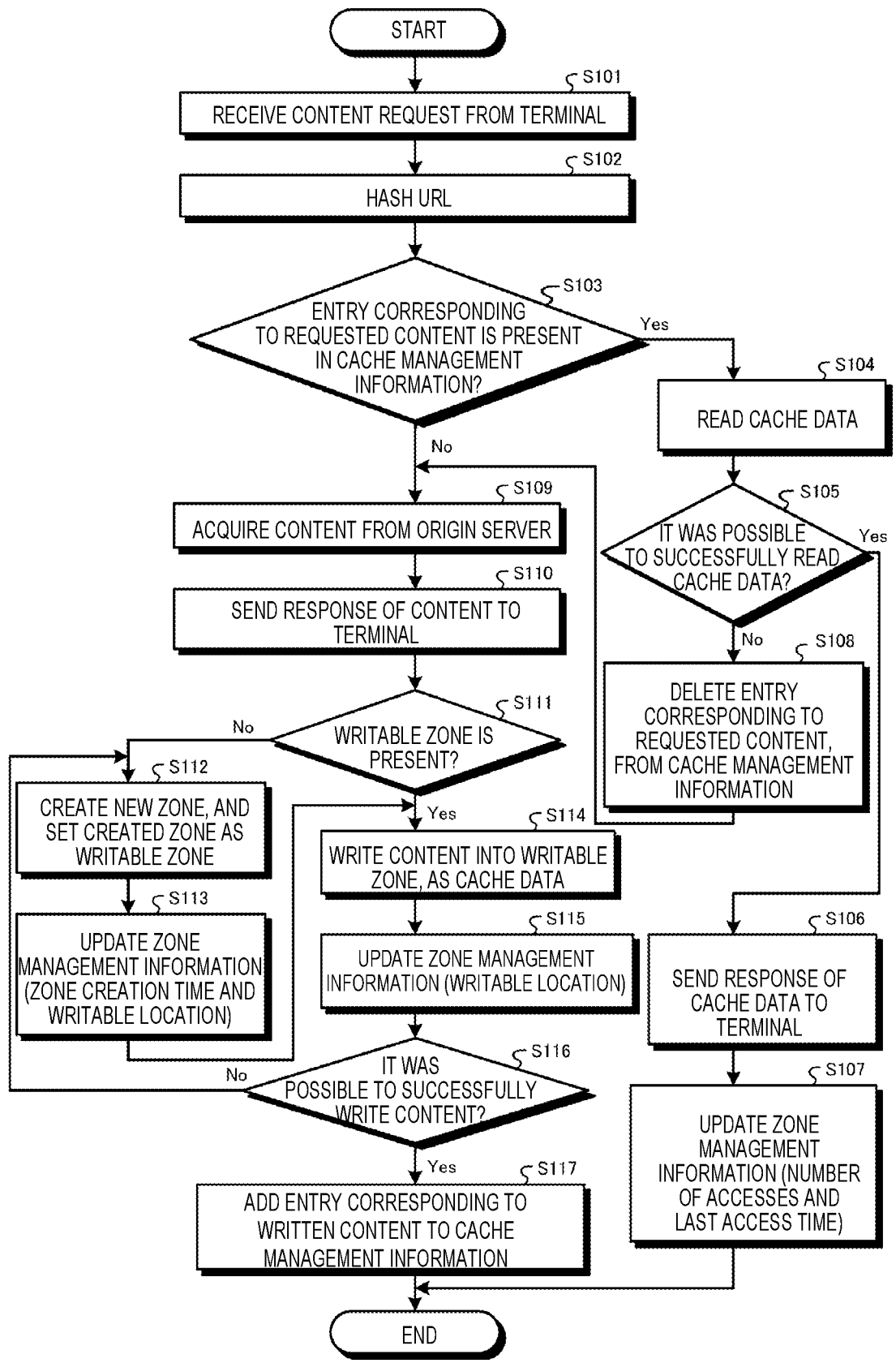
FIG. 13 is a flowchart illustrating an example of an operation of the cache server according to the first embodiment in response to a content request from a terminal.

FIG. 13 is a flowchart illustrating an example of an operation of the cache server 1 according to the first embodiment in response to a content request from the terminal 5.

When the cache server 1 receives a content request from the terminal 5 (S101), the request is received by the cache data controller 101. Then, the hash generator 102 hashes an URL included in the received content request (S102).

The cache reader/writer 105 uses the hash value generated by the hash generator 102, as a search key, to search the cache management information 103, and then determines whether an entry corresponding to the requested content is present in the cache management information 103 (S103).

When the requested content is stored as cache data in the SSD 15, the entry corresponding to the requested content is present in the cache management information 103. Therefore, the process executed in S103 corresponds to a process of determining whether the requested content is stored as cache data in the SSD 15.

When the entry corresponding to the requested content is present in the cache management information 103 (S103: Yes), that is, when the determination result is a cache hit, the cache reader/writer 105 controls the SSD 15 so as to read the requested content stored as cache data in the SSD 15 (S104).

In S104, the cache reader/writer 105 acquires a logical address value indicating a head location of a range where the requested content is stored, on the basis of the offset included in the entry obtained through the search in S103. The cache reader/writer 105 acquires a size from the corresponding entry. The cache reader/writer 105 calls the function of the SSD device driver 113, and transmits a read command to the SSD 15 via the SSD device driver 113. When transmitting the read command, the cache reader/writer 105 specifies, as a read target location, identification information of a zone where the requested content is stored, and the logical address value indicating the head location of the range where the requested content is stored. Then, the cache reader/writer 105 acquires data in the range corresponding to the size acquired from the entry, from the SSD 15.

After S104, the cache reader/writer 105 determines whether it was possible to successfully read cache data (S105). When it was possible to successfully read cache data (S105: Yes), the cache data controller 101 sends a response of the cache data to the terminal 5 by calling the function of the network interface driver 114 and using the function (S106). The zone controller 106 updates the zone management information 107 (S107). In S107, the zone controller 106 operates to increment the number of accesses recorded in the zone management information 107, and updates the last access time recorded in the zone management information 107. After S107, the operation based on the content request from the terminal 5 is ended.

When it was not possible to successfully read cache data for some reason (S105: No), the cache reader/writer 105 deletes the entry obtained through the search in S103, from the cache management information 103 (S108).

When the entry corresponding to the requested content is not present in the cache management information 103 (S103: No), that is, when the determination result is a cache miss, or after S108, the data acquisition unit 104 acquires the content requested by the terminal 5, from the origin server 2 (S109). In S109, the data acquisition unit 104 calls and uses the function of the network interface driver 114.

Subsequently, the cache data controller 101 sends a response of the content acquired by the data acquisition unit 104, to the terminal 5, by calling the function of the network interface driver 114 and using the function (S110).

Subsequently, the cache reader/writer 105 determines whether there is a writable zone (S111). When there is no writable zone (S111: No), the zone controller 106 creates a new zone by controlling the SSD 15, and sets the created zone as a writable zone (S112). In S112, the zone controller 106 transmits a zone create command to the SSD 15 by calling the function of the SSD device driver 113 and using the function. When the zone create command is received, the controller 21 of the SSD 15 assigns the new zone in the physical address space 300.

After S112, the zone controller 106 updates the zone management information 107 (S113). In S113, the zone controller 106 records a zone creation time regarding the new zone, in the zone management information 107, and records a logical address value indicating a head location of the new zone, as a writable location regarding the new zone.

When there is a writable zone (S111: Yes), or after S113, the cache reader/writer 105 controls the SSD 15 so as to write the content acquired in S109, as cache data, into the writable zone (S114).

In S114, the cache reader/writer 105 acquires a writable location regarding the writable zone, from the zone management information 107, and acquires a logical address value corresponding to the writable location. Then, the cache reader/writer 105 calls the function of the SSD device driver 113, and transmits a write command to the SSD 15 via the SSD device driver 113. When transmitting the write command, the cache reader/writer 105 transmits the logical address value corresponding to the writable location, and the content acquired in S109, to the SSD 15.

After S114, the zone controller 106 updates the zone management information 107 (S115). In S115, the zone controller 106 sets a location subsequent to the range where the content is written at the writable location regarding the writable zone, as a new writable location.

After S115, the cache reader/writer 105 determines whether it was possible to successfully write the content (S116). When it was not possible to successfully write the content for some reason (S116: No), for example, because the content did not fall within an available area of the writable zone, the control proceeds to S112.

When it was possible to successfully write the content (S116: Yes), the cache reader/writer 105 adds an entry corresponding to the written content, to the cache management information 103 (S117). Then, the operation based on the content request from the terminal 5 is ended.

Figure 14:
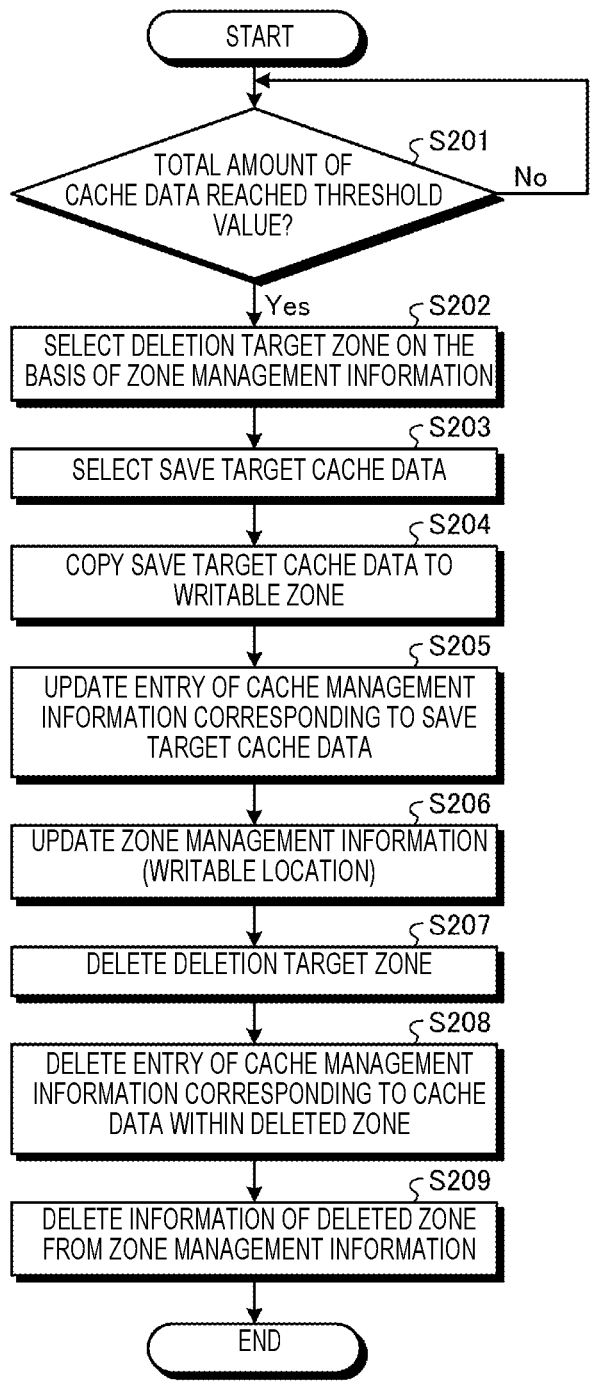
FIG. 14 is a flowchart illustrating an example of an operation of deleting a zone in the first embodiment.

FIG. 14 is a flowchart illustrating an example of an operation of deleting a zone in the first embodiment.

The zone controller 106 monitors the total amount of cache data in the SSD 15. Then, the zone controller 106 compares the total amount of cache data in the SSD 15 to a predetermined threshold value, and determines whether the total amount of cache data in the SSD 15 reaches the threshold value (S201).

The threshold value used for determination in S201 is larger than 0, and is smaller than the maximum amount (i.e., a user capacity) of content that may be stored in the SSD 15. For example, for the threshold value, the 80% capacity of the user capacity of the SSD 15 may be set as the threshold value by the designer. Further, the threshold value setting method is not limited to this number.

When the total amount of cache data in the SSD 15 does not reach the threshold value (S201: No), the zone controller 106 executes the process in S201 again. When the total amount of cache data in the SSD 15 reaches the threshold value (S201: Yes), the zone controller 106 selects a deletion target zone on the basis of the zone management information 107 (S202). As for a policy for determining the deletion target zone, for example, any of the above described policies 1 to 4 may be employed. The policy for determining the deletion target zone may be any policy other than the policies 1 to 4. The zone controller 106 may select the deletion target zone on the basis of the zone management information 107.

After S202, the zone controller 106 selects save target cache data (S203). As for a policy for selecting the cache data as the save target, for example, the above described policy 5 or 6 may be employed. The policy for selecting the save target cache data may be any policy different from both the policies 5 and 6.

Subsequently, the cache reader/writer 105 copies the save target cache data from the deletion target zone to a writable zone (S204). That is, the cache reader/writer 105 reads the save target cache data by controlling the SSD 15, and writes the read save target cache data into the writable zone.

Next, the cache reader/writer 105 updates an entry corresponding to the save target cache data, which is recorded in the cache management information 103 (S205). That is, the cache reader/writer 105 changes identification information of the zone included in the entry corresponding to the save target cache data, from identification information of the deletion target zone into identification information of the writable zone.

After S205, the zone controller 106 updates the zone management information 107 (S206). In S206, the zone controller 106 changes a writable location regarding the writable zone, into a location that reflects the state after the save target cache data is written.

Then, the zone controller 106 deletes the deletion target zone by controlling the SSD 15 (S207). Specifically, the zone controller 106 calls the function of the SSD device driver 113 and uses the function of the SSD device driver 113 so as to transmit a command for erasing all data pieces stored in the deletion target zone, to the SSD 15. Further, the zone controller 106 uses the function of the SSD device driver 113 so as to transmit a zone deletion command to the SSD 15. In the SSD 15, the controller 21 executes the command for erasing all data pieces stored in the deletion target zone, and then receives the zone deletion command. When the zone deletion command is received, the controller invalidates the assignment of (i.e., dissociate) the corresponding zone.

Subsequently, the cache reader/writer 105 deletes an entry of the cache management information 103 corresponding to cache data in the deleted zone (S208). The zone controller 106 deletes information of the deleted zone from the zone management information 107 (S209). Then, the operation of deleting the zone is ended.

The execution of the process in S203 to S206 is optional. The cache server 1 does not necessarily have to execute the process in S203 to S206.

As described above, according to the first embodiment, the SSD 15 as a ZNS SSD is used as a storage device for storing content distributed from the origin server 2 as a distribution server, as cache data. Specifically, the CPU 11 as a processor creates a plurality of zones for storing one or more contents in the storage area 200 by controlling the SSD 15. The CPU 11 receives a content request from the terminal 5. When the content requested by the terminal 5 is stored in any of the zones, the CPU 11 reads the corresponding content from the SSD 15 by controlling the SSD 15, and sends a response of the corresponding read content to the terminal 5. When the content requested by the terminal 5 is not stored in any of the zones, the CPU 11 acquires the content requested by the terminal 5 from the origin server 2, and sends a response of the acquired content to the terminal 5. The CPU 11 controls the SSD 15 so as to write the acquired content into an available area in a writable zone among the zones. When the total amount of the cache data in the SSD 15 reaches a threshold value, the CPU 11 selects one deletion target zone from the zones, and collectively deletes all contents in the deletion target zone.

The ZNS SSD has a larger storage capacity than the SSD of the comparative example. In the first embodiment, the ZNS SSD is utilized as a storage device for caching content distributed from the origin server 2. Therefore, as compared to in the case of the SSD of the comparative example adopted as a storage device for caching content, it is possible to simply implement a cache server having a large storage capacity at low cost.

Into each zone, content is sequentially written in order of logical address. That is, when one or more contents are already stored in a writable zone, the CPU 11 designates a location subsequent to an area where content was lastly written in the writable zone, as a write destination for newly acquired content, and causes the SSD 15 to execute writing of the newly acquired corresponding content.

Accordingly, for each zone, writing is sequentially implemented in order of logical address.

As described above, a writable location may be aligned with a boundary of predetermined unit areas such as sectors, clusters, or pages. When the writable location is aligned with a boundary of predetermined unit areas, in one zone, there may be a slight gap between an area where some content is written, and an area where the following content is written.

In the first embodiment, the CPU 11 manages the zone management information 107 that is information related to an access to each zone. Then, when the total amount of cache data in the SSD 15 reaches a threshold value, the CPU 11 selects a deletion target zone on the basis of the zone management information 107.

In the first embodiment, the CPU 11 may be configured to be able to save a part of content in a deletion target zone. Specifically, when the total amount of cache data in the SSD 15 reaches a threshold value, the CPU 11 may read the save target content in the deletion target zone by controlling the SSD 15, and write the read save target content into a writable zone. Then, the CPU 11 collectively deletes all contents in the deletion target zone.

Second Embodiment

In a second embodiment, in an SSD as a storage device, a plurality of zones may be set as writable zones. For example, when the SSD may have a maximum of M (where M is an integer of 3 or more) zones, N (where N is an integer of 2 or more and M or less) zones may be set as writable zones. Further, the second embodiment is applicable to even a case where a storage device is implemented by SSDs 15 in each of which only one writable zone is set.

Hereinafter, a cache server according to the second embodiment will be described. The cache server according to the second embodiment is denoted by a reference numeral 1a. Among elements in the cache server 1a according to the second embodiment, the same elements as those in the first embodiment are denoted by the same names and reference numerals as those in the first embodiment. Descriptions on the same elements as those in the first embodiment among elements in the cache server 1a according to the second embodiment will be simplified or omitted.

Figure 15:
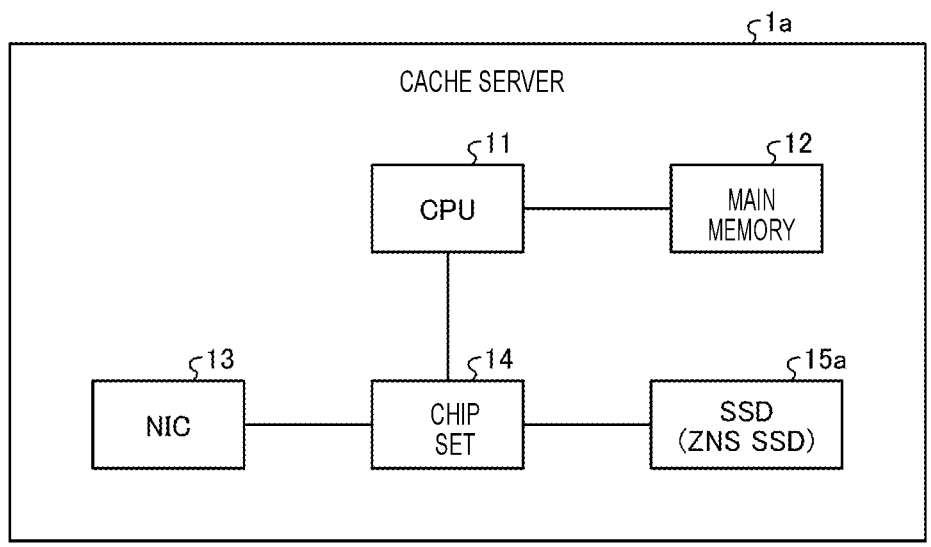
FIG. 15 is a schematic diagram illustrating an example of a hardware configuration of a cache server according to a second embodiment.

FIG. 15 is a schematic diagram illustrating an example of a hardware configuration of the cache server 1a according to the second embodiment. The cache server 1a includes the CPU 11, the main memory 12, the NIC 13, the chipset 14, and an SSD 15a. The SSD 15a is an example of a storage device of the second embodiment. The SSD 15a is a ZNS SSD. The SSD 15a has the same configuration as the SSD 15 in the first embodiment except that in the configuration, a plurality of zones may be set as writable zones at the same time.

As in the first embodiment, in the cache server 1a, the CPU 11 executes the CDN cache software 100 and the operating system program 110. The CPU 11 implements the function as a cache data controller 101a by executing the CDN cache software 100.

Figure 16:
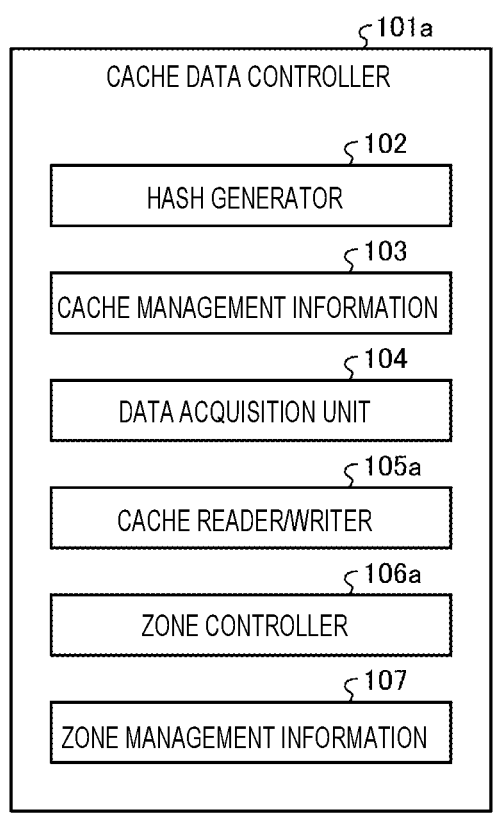
FIG. 16 is a schematic diagram illustrating an example of a more detailed functional configuration of a cache data controller implemented in the cache server according to the second embodiment.

FIG. 16 is a schematic diagram illustrating an example of a more detailed functional configuration of the cache data controller 101a according to the second embodiment. The cache data controller 101a includes the hash generator 102, the cache management information 103, the data acquisition unit 104, a cache reader/writer 105a, a zone controller 106a, and the zone management information 107. That is, the functional configuration of the cache data controller 101a is different from that of the cache data controller 101 in the first embodiment in that instead of the cache reader/writer 105 and the zone controller 106, the cache reader/writer 105a and the zone controller 106a are provided.

The zone controller 106a sets a plurality of zones as writable zones. The number of writable zones may be fixed or properly changed. The zone controller 106a executes creation of a zone, deletion of a zone, and management of the zone management information 107 in the same way as the zone controller 106 in the first embodiment.

The cache reader/writer 105a writes content acquired from the origin server 2 by the data acquisition unit 104, as cache data, into the SSD 15, or reads content stored as cache data in the SSD 15, from the SSD 15.

Figure 17:
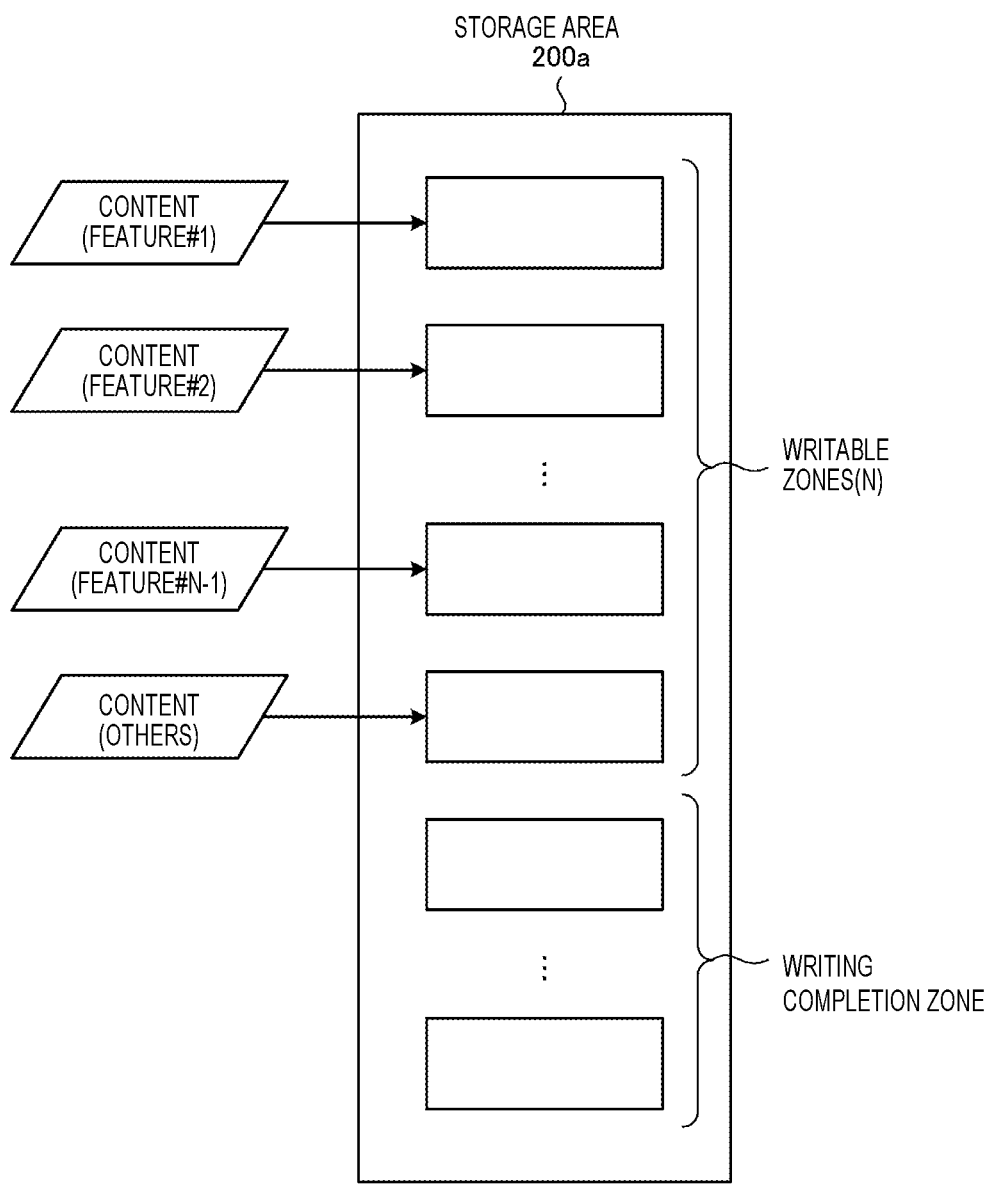
FIG. 17 is a schematic diagram illustrating a method of setting writable zones in the second embodiment.

The cache reader/writer 105a selects a write destination zone for the content acquired from the origin server 2 by the data acquisition unit 104, on the basis of the feature of the corresponding content. For example, as illustrated in FIG. 17, among N writable zones, N−1 writable zones are associated with different features, respectively. When the feature of the content acquired from the origin server 2 corresponds to the feature associated with one of the N−1 writable zones, the cache reader/writer 105 writes the acquired content into the corresponding zone. When the feature of the content acquired from the origin server 2 does not correspond to any of the features associated with the N−1 writable zones, the acquired content is written into the remaining one zone among the N writable zones.

The method of defining a feature is not limited to a specific method. Hereinafter, an example of a feature defining method will be described.

For example, a method of defining a feature on the basis of the relationship between contents may be adopted. When a video of one title (e.g., a movie title) is divided into a plurality of chunk data pieces (i.e., a plurality of contents), the corresponding contents are considered to have the same features. Two contents that make up videos having different titles are considered to have different features, respectively. That is, in a case where content is video, the title of the corresponding video is treated as a feature. Two contents that make up videos having the same titles but different resolutions may be considered to have the same features, or may be considered to have different features, respectively. Two contents that make up videos having the same titles but different video algorithms may be considered to have the same features, or may be considered to have different features, respectively.

Figure 18:
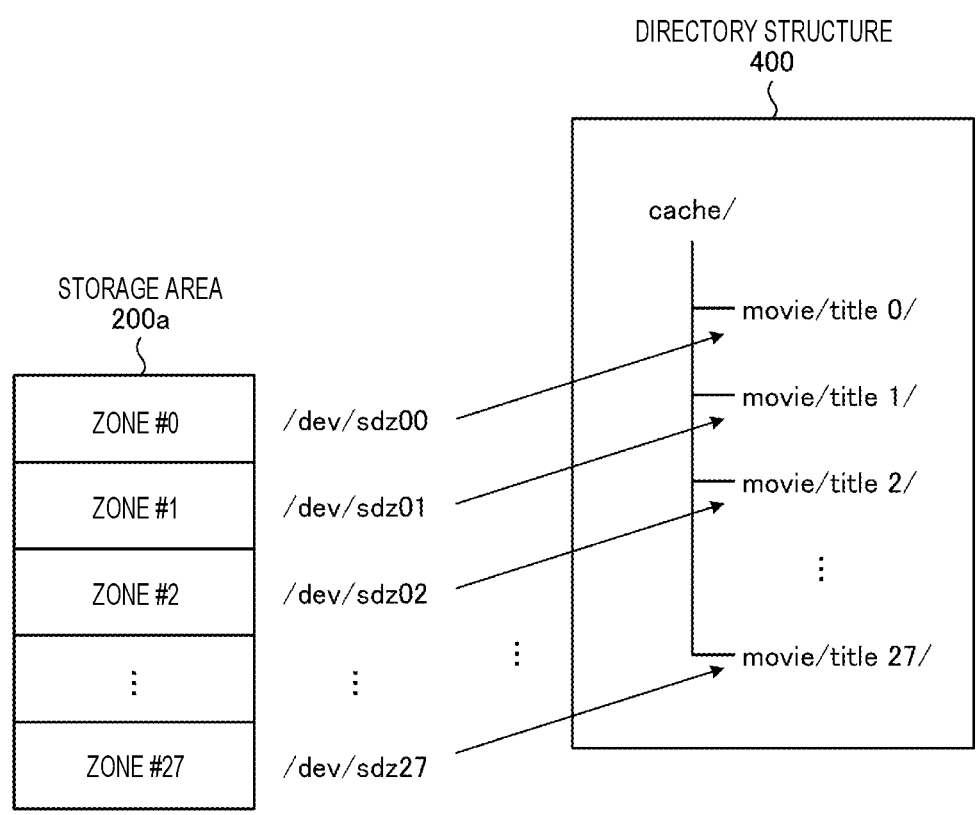
FIG. 18 is a schematic diagram illustrating an example of a method of assigning zones in the second embodiment.

FIG. 18 is a schematic diagram illustrating an example of a method of assigning zones in the second embodiment, on the basis of the relationship between contents. In the example illustrated in FIG. 18, 28 zones #0 to #27 are assigned as writable zones in a storage area 200a. A unique path is given to each zone. For example, a path "/dev/sdz00" is given to the zone #0. In order to simplify the access to cache, a directory structure 400 is generated. The directory structure 400 is generated and managed by, for example, the zone controller 106a. A name "cache" is given to the top-level directory of the directory structure 400. A directory named "movie" is prepared under the directory "cache". Under the directory "movie", 27 directories each of which is given a movie title are prepared. "title1", "title2", etc. are movie titles. Any one of 27 zones #0 to #27 is mounted in each of the 27 directories given the movie titles.

That is, in the example illustrated in FIG. 18, each of movies of the 27 titles is regarded as a unique feature. When content that makes up one of movies of the 27 titles is acquired from the origin server 2, the cache reader/writer 105a controls the SSD 15a so as to write the acquired content into a zone corresponding to the corresponding movie title.

As another example of the feature definition method, a method of classifying features according to the types of content, such as a video, a still image, or others, may be adopted. That is, the zone controller 106a associates a writable zone with each content type, and the cache reader/writer 105a selects a write destination zone on the basis of the type of content acquired from the origin server 2. A method of determining the content type is not limited to a specific method. For example, the cache reader/writer 105a may determine the type of content by referring to information recorded as "Content Type" included in a hypertext transfer protocol (HTTP) header.

As yet another example of the feature definition method, a method of regarding the size of content as a feature may be adopted. That is, the zone controller 106a associates writable zones with different sizes, respectively. The cache reader/writer 105a selects a write destination zone on the basis of the size of content acquired from the origin server 2.

As yet another example of the feature definition method, a method of regarding the origin server 2 as a content distribution source, as a feature, may be adopted. For example, the zone controller 106a provides two writable zones. Then, the zone controller 106a associates an origin server 2-1 with one of the two writable zones, and associates an origin server 2-2 with the other of the two writable zones. The cache reader/writer 105a selects a write destination zone for content on the basis of whether the origin server 2 from which the corresponding content is acquired is the origin server 2-1 or the origin server 2-2.

Subsequently, the operation of the cache server 1a according to the second embodiment will be described.

Figure 19:
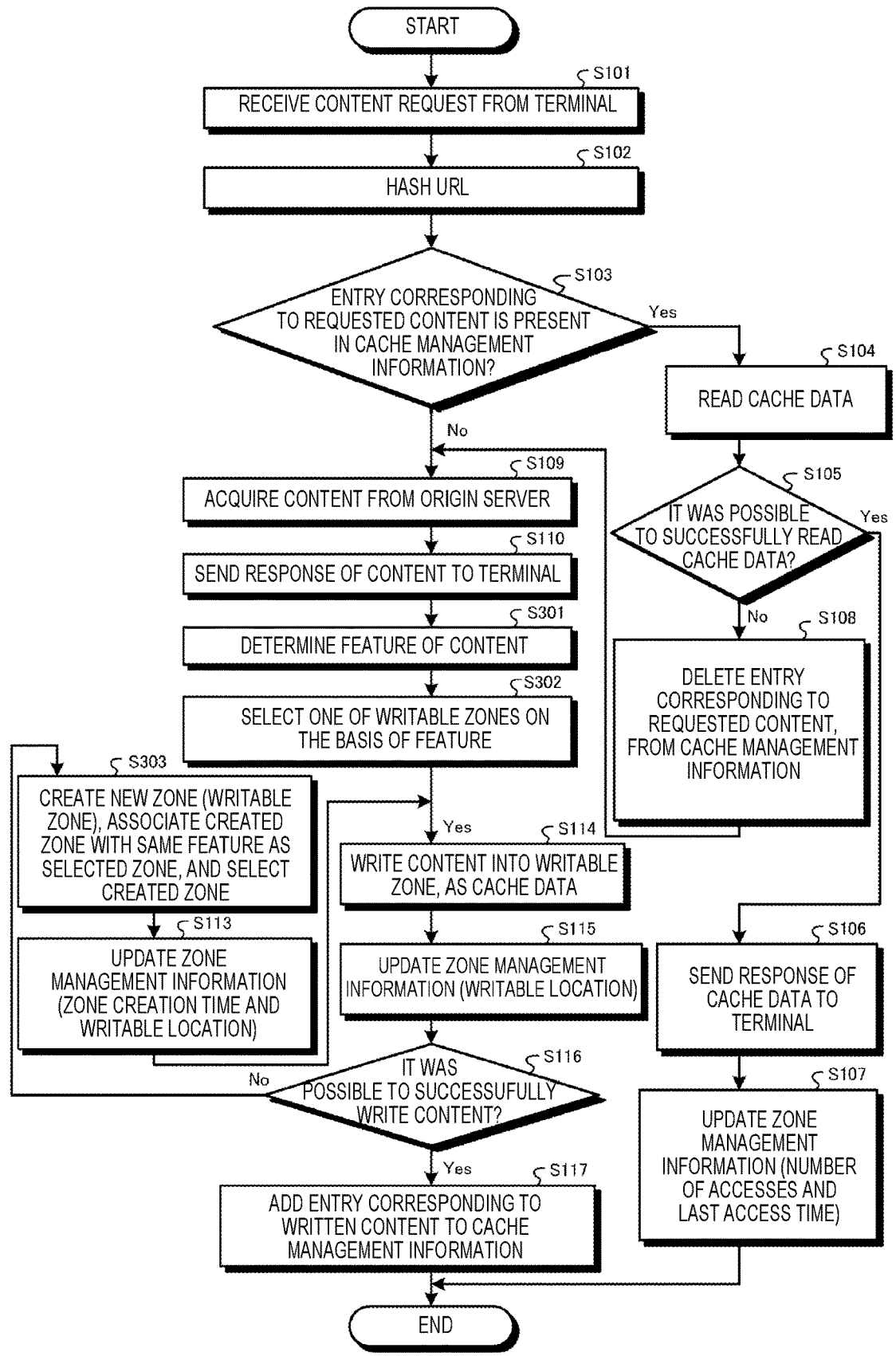
FIG. 19 is a flowchart illustrating an example of an operation of the cache server according to the second embodiment in response to a content request from the terminal.

FIG. 19 is a flowchart illustrating an example of an operation of the cache server 1a according to the second embodiment in response to a content request from the terminal 5.

In S101 to S110, the cache server 1a executes the same operation as that in the first embodiment. After the cache data controller 101a sends a response of content to the terminal 5 in S110, the cache reader/writer 105a determines the feature of the corresponding content (S301). Then, the cache reader/writer 105a selects one of writable zones, as a write destination zone on the basis of the determined feature (S302). Then, the control proceeds to S114, and the cache reader/writer 105a writes the content acquired from the origin server 2, into the selected writable zone. Next, in S115 to S117, the cache server 1a executes the same operation as that in the first embodiment.

For example, when it was not possible to successfully write the content because the content did not fall within an available area of the writable zone (S116: No), the zone controller 106a creates a new zone by using a zone create command, associates the created zone with the same feature as that of the selected zone (i.e., the feature determined in S301), and selects the created zone as the write destination zone (S303). Then, the zone controller 106a executes update of the zone management information 107 according to the creation of the zone (S113). Then, the control proceeds to S114.

As described above, according to the second embodiment, the CPU 11 selects a write destination zone from a plurality of zones on the basis of the feature of the content acquired from the origin server 2.

As for a method of deleting a zone in the second embodiment, the same method as the method in the first embodiment described with reference to FIG. 14 may be adopted. As for a policy for selecting a deletion target zone, policies 1 to 4, or other policies may be adopted. As for a policy for selecting save target cache data, the policy 5, the policy 6, or other policies may be adopted. Further, in the second embodiment as well, the process of saving cache data in the deletion target zone is optional.

As the frequently requested content cached in the cache server increases, a higher cache effect may be obtained. Even when the cache server caches content that is no longer needed, that is, content that is no longer requested by the terminal, a cache effect caused by caching of the corresponding content may not be obtained.

In the ZNS SSD, all contents stored in one zone are collectively erased. When contents having a timing when the contents are no longer needed are collectively stored in one zone, there is a possibility that a cache effect may be enhanced. For example, when as for a policy for selecting a deletion target zone, any one of the policies 2 to 4 is adopted, contents that are no longer needed may be collectively erased. Accordingly, the cache server may cache a large amount of frequently requested content, and thus, a high cache effect may be obtained.

In the second embodiment, content is stored in a zone based on the feature of the content. Contents having the same features may be no longer needed at almost the same timing. For example, the request frequencies of contents that make up a movie of a certain title are decreased at almost the same timing, when the movie of the corresponding title becomes less popular. Therefore, according to the second embodiment, particularly when any one of the policies 2 to 4 is adopted as for the policy for selecting a deletion target zone, a high cache effect may be obtained. Further, even when any policy other than the policies 2 to 4 is adopted as the policy for selecting the deletion target zone, there is a possibility that the cache effect is enhanced.

Third Embodiment

In a third embodiment, the time when content is no longer needed is estimated, and a write destination zone of the corresponding content is selected according to the estimated time. Hereinafter, the time when content is no longer needed is referred to as an effect disappearance time or an obsoletion time in the sense that at that time, a cache effect obtained by caching the corresponding content disappears. A time length from a caching time to an effect disappearance time is referred to as an effect duration.

The cache server according to the third embodiment is denoted by a reference numeral 1b. Among elements in the cache server 1b according to the third embodiment, the same elements as those in the second embodiment are denoted by the same names and reference numerals as those in the second embodiment. Descriptions on the same elements as those in the second embodiment among elements in the cache server 1b according to the third embodiment will be simplified or omitted.

The cache server 1b has the same hardware configuration as the cache server 1a according to the second embodiment. As in the second embodiment, in the cache server 1b, the CPU 11 executes the CDN cache software 100, and the operating system program 110. The CPU 11 implements the function as a cache data controller 101b by executing the CDN cache software 100.

Figure 20:
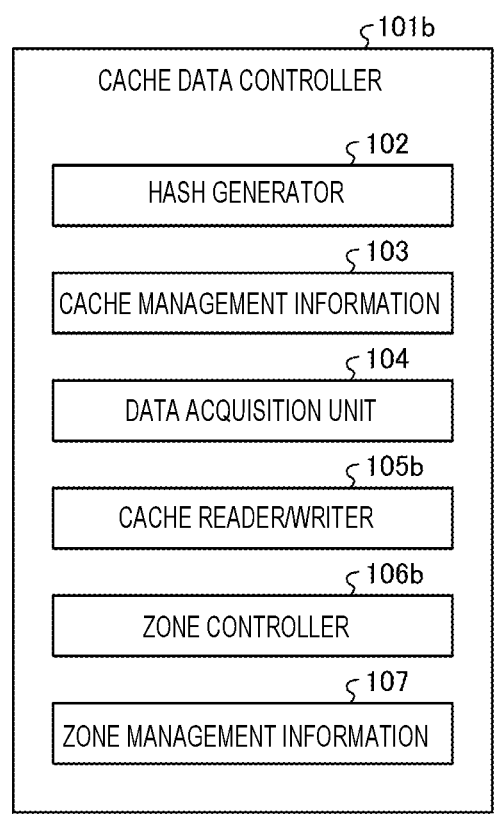
FIG. 20 is a schematic diagram illustrating an example of a more detailed functional configuration of a cache data controller implemented in a cache server according to a third embodiment.

FIG. 20 is a schematic diagram illustrating an example of a more detailed functional configuration of the cache data controller 101b in the third embodiment. The cache data controller 101b includes the hash generator 102, the cache management information 103, the data acquisition unit 104, a cache reader/writer 105b, a zone controller 106b, and the zone management information 107. That is, the functional configuration of the cache data controller 101b is different from that of the cache data controller 101a in the second embodiment in that instead of the cache reader/writer 105a and the zone controller 106a, the cache reader/writer 105b and the zone controller 106b are provided.

The zone controller 106b creates a plurality of zones, and associates the created zones with different times, respectively. The zone controller 106b manages the corresponding zones as writable zones. When a time associated with a zone arrives, the zone controller 106b executes initialization of the zone, that is, erasure of all contents in the corresponding zone, and associates the corresponding zone with a time later than any of times already associated with other zones.

When content is acquired from the origin server 2, the cache reader/writer 105b estimates an effect duration related to the corresponding content.

The method of estimating an effect duration is not limited to a specific method. Hereinafter, several examples of the effect duration estimation method will be described.

Figure 21:
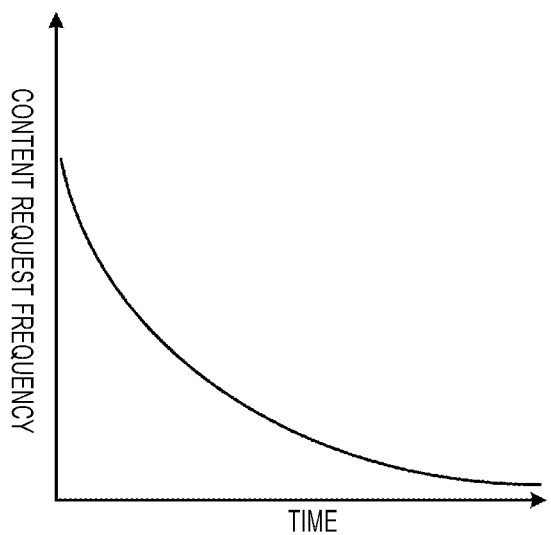
FIG. 21 is a graph illustrating an example of a transition of a content request frequency.

As an example, a method of estimating an effect duration related to content on the basis of the interval of requests for corresponding content may be adopted. For example, as illustrated in the graph of FIG. 21, it may be thought that the request frequency of one content is attenuated with the lapse of time. Therefore, a threshold value for determining whether the corresponding content is unnecessary may be set for the content request frequency. Then, the time length until the corresponding content request frequency falls below the corresponding threshold value may be calculated on the basis of the relationship illustrated in FIG. 21. As a result, it is possible to obtain the estimated value of the effect duration.

Figure 22:
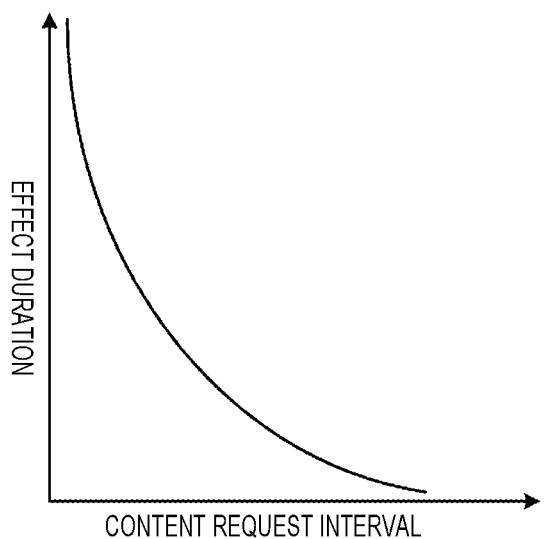
FIG. 22 is a graph illustrating an example of the relationship between a content request interval and an effect duration.

It may be thought that the content request frequency corresponds to a reciprocal of a content request interval. Therefore, according to the relationship illustrated in FIG. 21, as the relationship between the content request interval and the effect duration, the relationship illustrated in the graph of FIG. 22 may be obtained. The cache reader/writer 105b measures an interval of requests for target content (i.e., content as an effect duration estimation target). Then, the cache reader/writer 105b acquires the estimated value of the effect duration related to the target content on the basis of the measurement value of the request interval of the target content, and preset information indicating the relationship between the content request interval and the effect duration, which is illustrated in FIG. 22.

In another example, a method may be adopted in which an effect duration is estimated on the basis of numerical information recorded as "max-age" of "cache-control" included in the HTTP header of the HTTP file indicating the Web page indicating a distribution source of content. The cache reader/writer 105b may acquire numerical information recorded as "max-age" of "cache-control" included in the HTTP header, as the effect duration. Otherwise, the cache reader/writer 105b may regard a value obtained by executing predetermined calculation on the corresponding numerical information, for example, multiplication by 0.8, as the effect duration.

In another example, the cache reader/writer 105b may estimate an effect duration on the basis of the reaction rate of the origin server 2 or the transfer rate of content.

Here, as an example, it is assumed that the cache reader/writer 105b estimates the effect duration on the basis of the content request interval.

The cache reader/writer 105b estimates an effect disappearance time on the basis of the estimated value of the effect duration. For example, the cache reader/writer 105b acquires an estimated value of the effect disappearance time by adding the estimated value of the effect duration to a current time. The cache reader/writer 105 selects a write destination zone on the basis of the estimated value of the effect disappearance time, and the time associated with each zone.

Next, the operation of the cache server 1b according to the third embodiment will be described.

Figure 23:
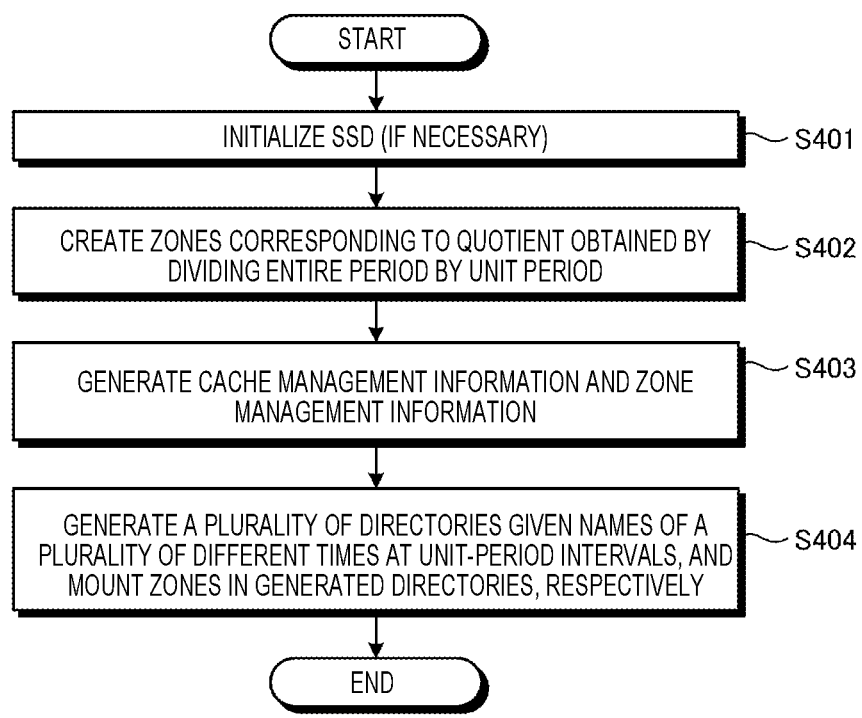
FIG. 23 is a flowchart illustrating an example of an operation of the cache server according to the third embodiment.

FIG. 23 is a flow chart illustrating an example of an operation of the cache server 1b according to the third embodiment, in which zones are created in the SSD 15a placed in a state where the zones are not yet created.

First, the cache data controller 101b executes initialization of the SSD 15a by controlling the SSD 15a (S401). Through the initialization, a storage area 200b of the SSD 15 is placed in a state where no zone is set. Further, the execution of S401 is optional. For example, when the initialization of the SSD 15a is completed, the process of S401 may be skipped.

Subsequently, the zone controller 106b controls the SSD 15a so as to create zones corresponding to a quotient obtained by dividing the entire period by a unit period (S402). The entire period is a set time length indicating the maximum time length during which one content may be stored as cache data. The unit period is a set time length indicating an interval of times in which each of the times is set for the zone. For example, when the entire period is "7 days", and the unit period is "6 hours", the zone controller 106b creates 28 zones.

Subsequently, the cache reader/writer 105b generates the cache management information 103, and the zone controller 106b generates the zone management information 107 (S403). The cache reader/writer 105b generates blank cache management information 103 in which no entry is recorded. For all the created zones, the zone controller 106b generates the zone management information 107 in which a zone creation time is recorded.

Subsequently, the zone controller 106b generates a plurality of directories given names representing a plurality of different times at unit-period intervals, and mounts the zones in the generated directories, respectively (S404). Then, the operation in which zones are created in the SSD 15a placed in a state where the zones are not yet created is ended.

Mounting a zone in a directory is associating a zone with a directory. After the zone is mounted in the directory, the cache reader/writer 105b may access the corresponding zone by accessing the corresponding directory.

Figure 24:
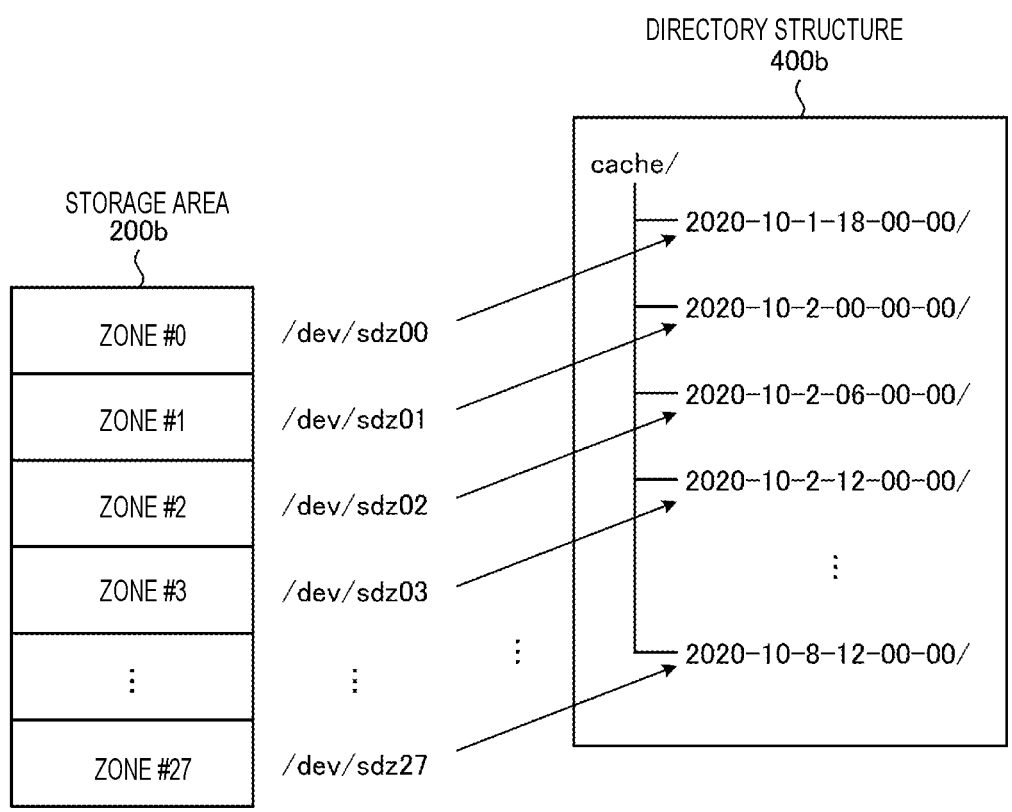
FIG. 24 is a schematic diagram illustrating a specific example of a plurality of zones created by a series of operations illustrated in FIG. 23, and a time associated with each zone.

FIG. 24 is a schematic diagram illustrating a specific example of a plurality of zones created by a series of operations illustrated in FIG. 23, and a time associated with each zone. In the example illustrated in FIG. 24, the entire period is "7 days", and the unit period is "6 hours". Therefore, the zone controller 106b creates 28 zones #0 to #27 in the storage area 200b. A unique path is given to each zone. For example, a path "/dev/sdz00" is given to the zone #0. The zone controller 106b generates a directory structure 400b. A name "cache" is given to the top-level directory of the directory structure 400b. Then, the zone controller 106b generates directories corresponding to the number of created zones, that is, 28 directories under the directory "cache". The zone controller 106b calculates 28 different times at 6-hour intervals on the basis of a predetermined time (e.g., the time when a series of operations illustrated in FIG. 23 is executed), and gives a name representing any one of the 28 different times, to each of the 28 directories. The zone controller 106b gives a name "YYYY-MM-DD-hh-mm-ss", as an example of a name representing a time, to each directory. Meanwhile, "YYYY" represents the year, "MM" represents the month, "DD" represents the day, "hh" represents the hour, "mm" represents the minute, and "ss" represents the second. According to the example illustrated in FIG. 24, each of 28 names representing a total of 28 times at 6-hour intervals from 18:00 on Oct. 1, 2020 to 12:00 on Oct. 8, 2020 is uniquely given to each one of the 28 directories. Then, each one of the 28 zones #0 to #27 is uniquely mounted in one of the 28 directories given names representing times.

As described above, according to the example illustrated in FIG. 24, different times are associated with zones, respectively, via names of directories. However, the method of associating times with zones is not limited to this manner.

Figure 25:
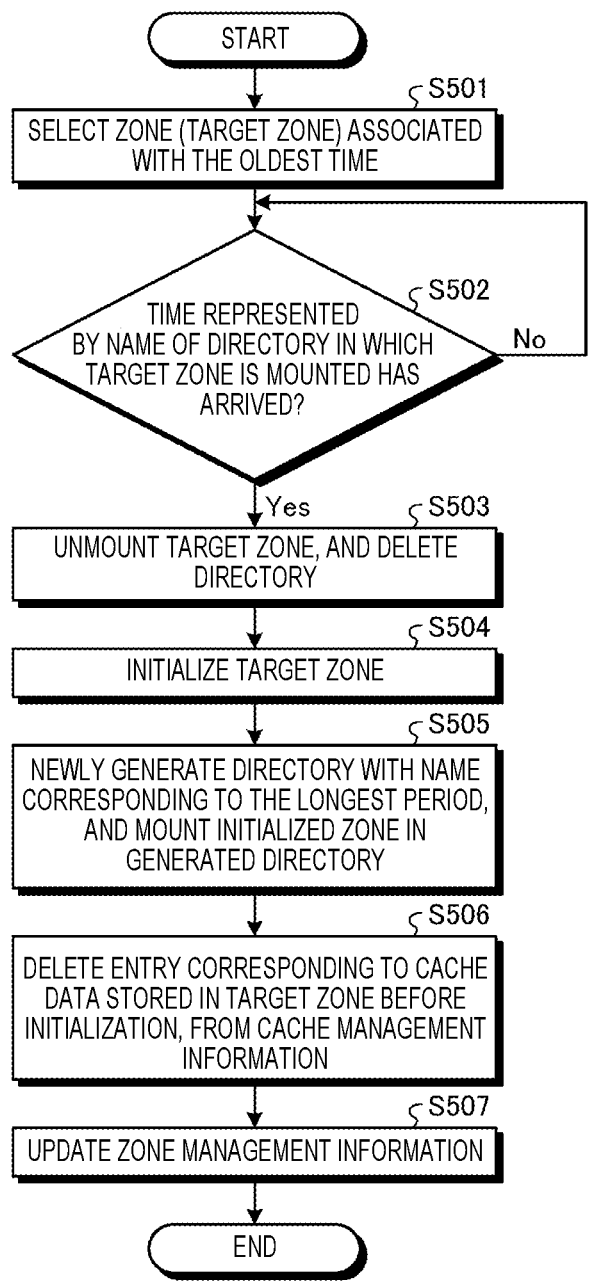
FIG. 25 is a flowchart illustrating an example of an operation of managing a zone according to time, in the third embodiment.

FIG. 25 is a flowchart illustrating an example of an operation of managing a zone according to time, in the third embodiment.

First, the zone controller 106b selects a zone associated with the oldest time among zones in the SSD 15a (S501). For example, in the example illustrated in FIG. 24, a zone #0, that is, a zone mounted in a directory given the name "2020-10-1-18-00-00", is selected. Hereinafter, the zone selected in the process of S501 will be referred to as a target zone.

Subsequently, the zone controller 106b determines whether the time represented by the name of the directory in which the target zone is mounted has arrived (S502). When it is determined that the corresponding time has not yet arrived (S502: No), the zone controller 106b executes the process of S502 again.

When it is determined that the corresponding time has arrived (S502: Yes), the zone controller 106b unmounts the target zone from the corresponding directory and deletes the corresponding directory (S503). Then, the zone controller 106b initializes the target zone by controlling the SSD 15a (S504). That is, the zone controller 106b transmits a command to the SSD 15a so as to erase all contents cached in the target zone.

More specifically, the zone controller 106b transmits an erase command to the SSD 15a via the SSD device driver 113 by calling the function of the SSD device driver 113. As already mentioned, in the ZNS SSD, data erasure is executed on a zone by zone basis. The zone controller 106b transmits an erase command in which all blocks that make up the target zone are designated as erasure targets.

Subsequently, the zone controller 106b newly generates a directory with a name corresponding to the longest period, and mounts the initialized zone in the corresponding directory (S505). The longest period is a time obtained by adding the unit period to the latest time among all times set for zones.

The cache reader/writer 105b deletes an entry corresponding to cache data stored in the target zone before initialization, from the cache management information 103 (S506).

The zone controller 106b updates the zone management information 107 (S507). That is, the zone controller 106b updates a zone creation time among the target zone-related information pieces included in the zone management information 107, at the initialization time of the target zone so as to reset the number of accesses or the last access time. Then, the operation of managing a zone according to the time is ended.

Before contents in the target zone are collectively erased, like the cache data controller 101 in the first embodiment, the cache data controller 101b may execute saving of content in the target zone. The method of selecting a copy destination of save target content is not limited to a specific selection method.

The series of operations illustrated in FIG. 25 is repeatedly executed.

Figure 26:
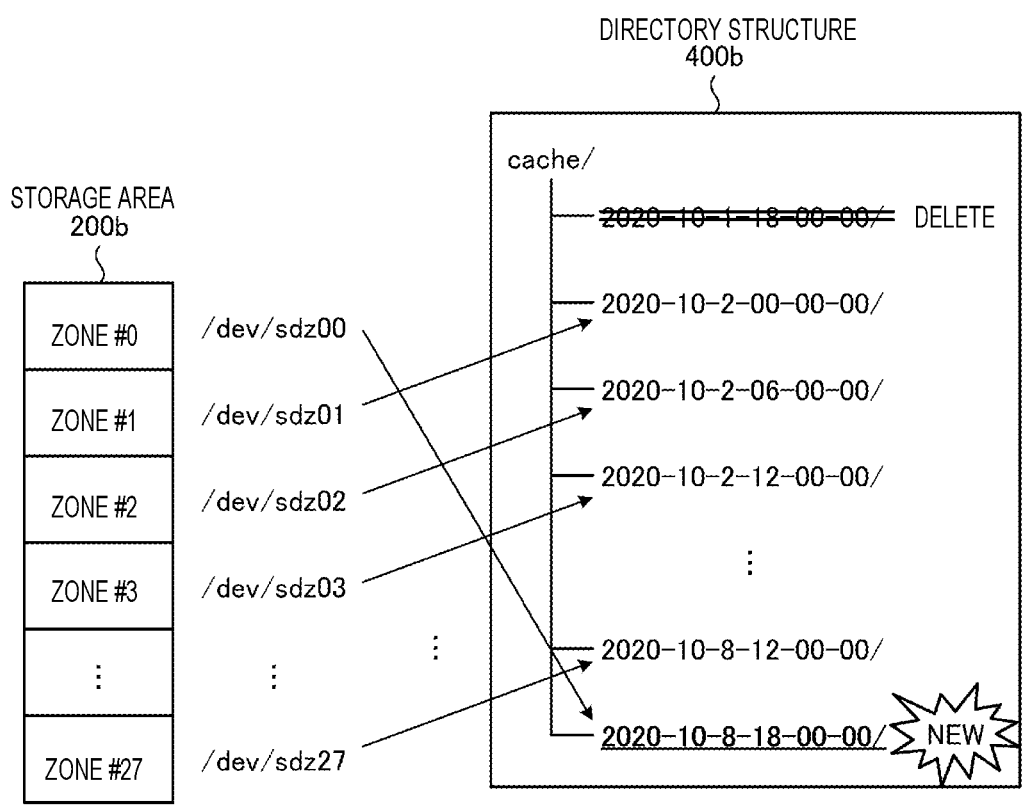
FIG. 26 is a schematic diagram illustrating a specific example of a change of time associated with each of zones.

FIG. 26 is a schematic diagram illustrating a specific example of a change of the time associated with each of zones. Further, FIG. 26 illustrates a change from the plurality of times illustrated in FIG. 24.

According to the example illustrated in FIG. 24, in the series of operations illustrated in FIG. 25, the zone #0 is selected as the target zone. The zone #0 is mounted in the directory with the name of "2020-10-1-18-00-00". That is, the zone #0 is associated with the time "1 Oct. 2020 18:00:00". When the time "1 Oct. 2020 18:00:00" associated with the zone #0 arrives, the zone controller 106b unmounts the zone #0, and deletes the directory with the name of "2020-10-1-18-00-00". Then, the zone controller 106b initializes the zone #0, that is, the zone controller 106b collectively deletes all contents in the zone #0. At the point in time when the time "1 Oct. 2020 18:00:00" arrives, the latest time among the times associated with the 28 zones is "8 Oct. 2020 12:00:00". Therefore, as illustrated in FIG. 26, the zone controller 106b newly generates a directory given a name representing "8 Oct. 2020 18:00:00" obtained by adding a unit period (i.e., 6 hours) to "8 Oct. 2020 12:00:00". Further, the time "8 Oct. 2020 18:00:00" represented by the name of the new directory is the same as the time of the timing when "7 days" set as the entire period just passed from the point in time when the time "1 Oct. 2020 18:00:00" arrived. The zone controller 106b mounts the zone #0 in the directory given the name representing "8 Oct. 2020 18:00: 00".

Through the above configuration, when the oldest time among times set for zones formed in the storage area 200b arrives, content in the zone associated with the corresponding oldest time is erased. Then, the time obtained when a time set as an entire period elapsed from the corresponding point in time is associated with the corresponding zone. This series of operations is repeatedly executed. As a result, it is possible to prepare a plurality of times and zones associated with the times, respectively, so as to cover most of the period up to a period subsequent to the time set as the entire period, at any point in time.

The arrival of the oldest time among the times associated with the zones is an example of a first condition in the third embodiment.

Figure 27:
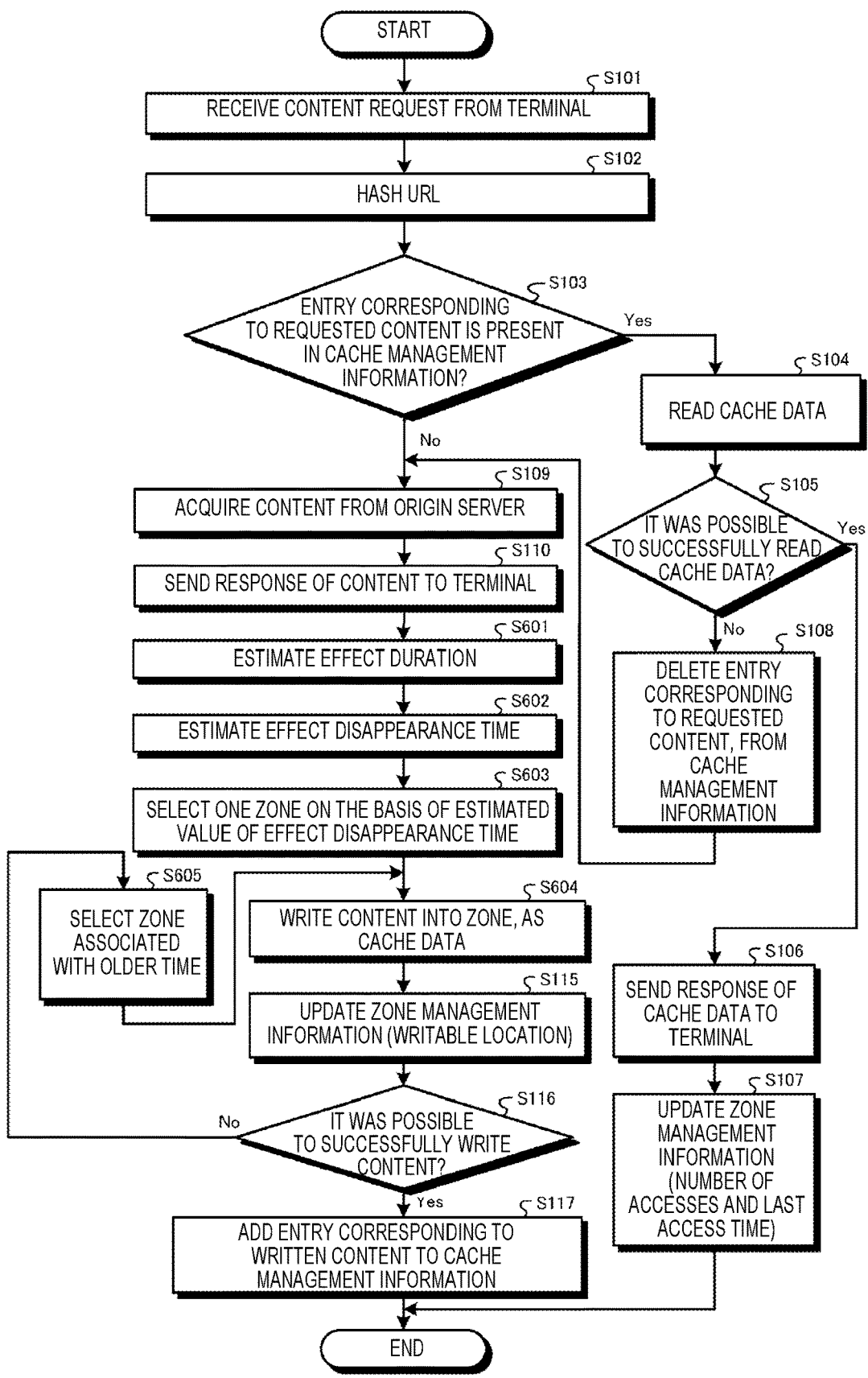
FIG. 27 is a flowchart illustrating an example of an operation of the cache server according to the third embodiment in response to a content request from the terminal.

FIG. 27 is a flowchart illustrating an example of an operation of the cache server 1b according to the third embodiment in response to a content request from the terminal 5.

In S101 to S110, the cache server 1b executes the same operation as those according to the first embodiment and the second embodiment. When the cache data controller 101b sends a response of content acquired by the data acquisition unit 104 to the terminal 5 in S110, the cache reader/writer 105b estimates an effect duration related to the corresponding content (S601).

Figure 28:
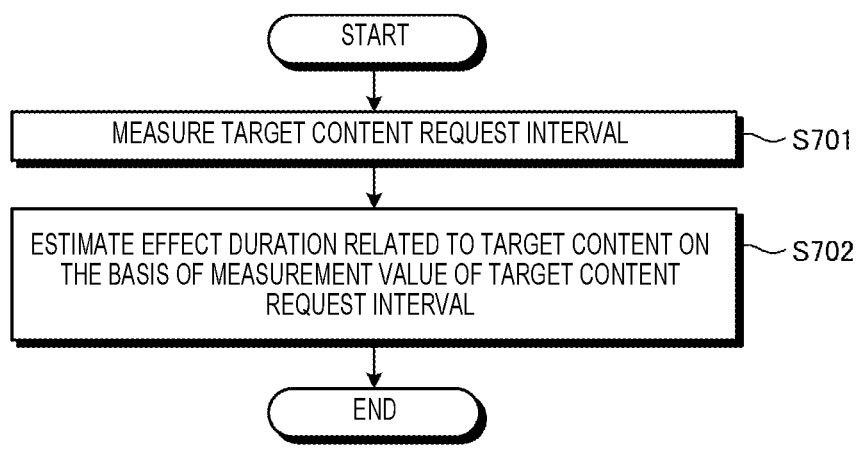
FIG. 28 is a flowchart illustrating an example of an operation of estimating an effect duration by a cache reader/writer in the third embodiment.

FIG. 28 is a flowchart illustrating an example of an operation of estimating an effect duration by the cache reader/writer 105b in the third embodiment.

First, the cache reader/writer 105b measures an interval of requests for target content (S701). The target content is content acquired in the process of S109.

In S701, in an example, the cache reader/writer 105b temporarily stores the target content in the main memory 12 or the like while storing the time when a request for the corresponding target content has been received, that is, the processing time of S101. Then, when the cache server 1b newly receives a target content request from any terminal 5, the cache reader/writer 105 acquires an interval between the stored time and the time when the target content request is newly received, as a measurement value of the target content request interval.

The method of measuring the target content request interval is not limited to the above method. The cache reader/writer 105b may acquire the time when the request for the target content is received three or more times, and may acquire the average of three or more acquired time-intervals, as the measurement value of the target content request interval.

After S701, the cache reader/writer 105b estimates the effect duration related to the target content on the basis of the measurement value of the target content request interval (S702). For example, the cache reader/writer 105b estimates the effect duration on the basis of the preset information indicating the relationship illustrated in FIG. 22 and the measurement value of the target content request interval. After S702, the estimation operation of the effect duration is ended.

Referring back to FIG. 27, after S601, the cache reader/writer 105b estimates an effect disappearance time related to the target content (S602). For example, the cache reader/writer 105b acquires the estimated value of the effect disappearance time by adding the estimated value of the effect duration to the time when the process in S602 is executed.

Subsequently, the cache reader/writer 105b selects a write destination zone of the target content among zones associated with times, on the basis of the estimated value of the effect disappearance time (S603).

For example, when the estimated value of the effect disappearance time is included between a time ti associated with one zone and a time ti+1 associated with another zone, that is, a time obtained by adding a unit period to the time ti, the cache reader/writer 105b selects the zone associated with the time ti+1 as a write destination zone of the target content. Alternatively, the cache reader/writer 105b may select the zone associated with the time ti as the write destination zone of the target content. When the estimated value of the effect disappearance time is less than the oldest time tmin among the times associated with the zones, the cache reader/writer 105b may select a zone associated with the time tmin as the write destination zone of the target content. When the estimated value of the effect disappearance time is greater than the latest time tmax among the times associated with the zones, the cache reader/writer 105b may select a zone associated with the time tmax as the write destination zone of the target content.

After S603, the cache reader/writer 105b writes the target content as cache data into the selected zone (S604). Next, in S115 to S117, the cache server 1b executes the same operation as those according to the first embodiment and the second embodiment.

For example, when it was not possible to successfully write the content because the target content did not fall within an available area of the selected zone (S116: No), the cache reader/writer 105b newly selects a zone associated with an older time, that is, a zone associated with a time older than the time associated with the selected zone by a unit period, as a write destination zone (S605). Then, the control proceeds to S603.

The method of selecting another zone as a write destination zone when it was not possible to successfully write content is not limited to the above method. For example, the cache reader/writer 105b may newly select a zone associated with a later time, that is, a zone associated with a time later than the time associated with the selected zone by a unit period, as a write destination zone.

In another example, the cache reader/writer 105b may select a write destination zone among other zones having available areas. The cache reader/writer 105b may newly select a zone associated with a time closest to the estimated value of the effect disappearance time among other zones having available areas, as the write destination zone.

As described above, according to the third embodiment, the CPU 11 associates one of different times with each of zones. The CPU 11 estimates an effect disappearance time related to content acquired from the origin server 2, that is, a time when a request frequency of the corresponding content falls below a threshold value. The CPU 11 selects a write destination zone among the zones on the basis of the effect disappearance time and the time associated with each of the zones.

Therefore, since contents having a timing when the contents are no longer needed may be collectively stored in one zone, a high cache effect can be obtained.

When the oldest time among the times each of which is associated with any of the zones arrives, the CPU 11 collectively deletes all contents in a zone associated with the corresponding oldest time (i.e., a target zone). Then, the CPU 11 associates the target zone with a time obtained by adding a unit period to the latest time among the times each of which is associated with any of the zones.

Therefore, since it is possible to collectively delete contents at a timing when the contents are no longer needed, a high cache effect can be obtained.

(Modification)

After determination of No is made in S116 of FIG. 27, a write destination zone is selected among zones having available areas. In such a case, when the state where the rate of writing of content into the SSD 15a exceeds a predetermined level (e.g., a value obtained by dividing one zone size by a unit period) is prolonged, the storage area 200b of the SSD 15a may run out of available areas in which new content may be cached. When there is no available area in the storage area 200b of the SSD 15a, the zone controller 106b may shorten the unit period.

Figure 29:
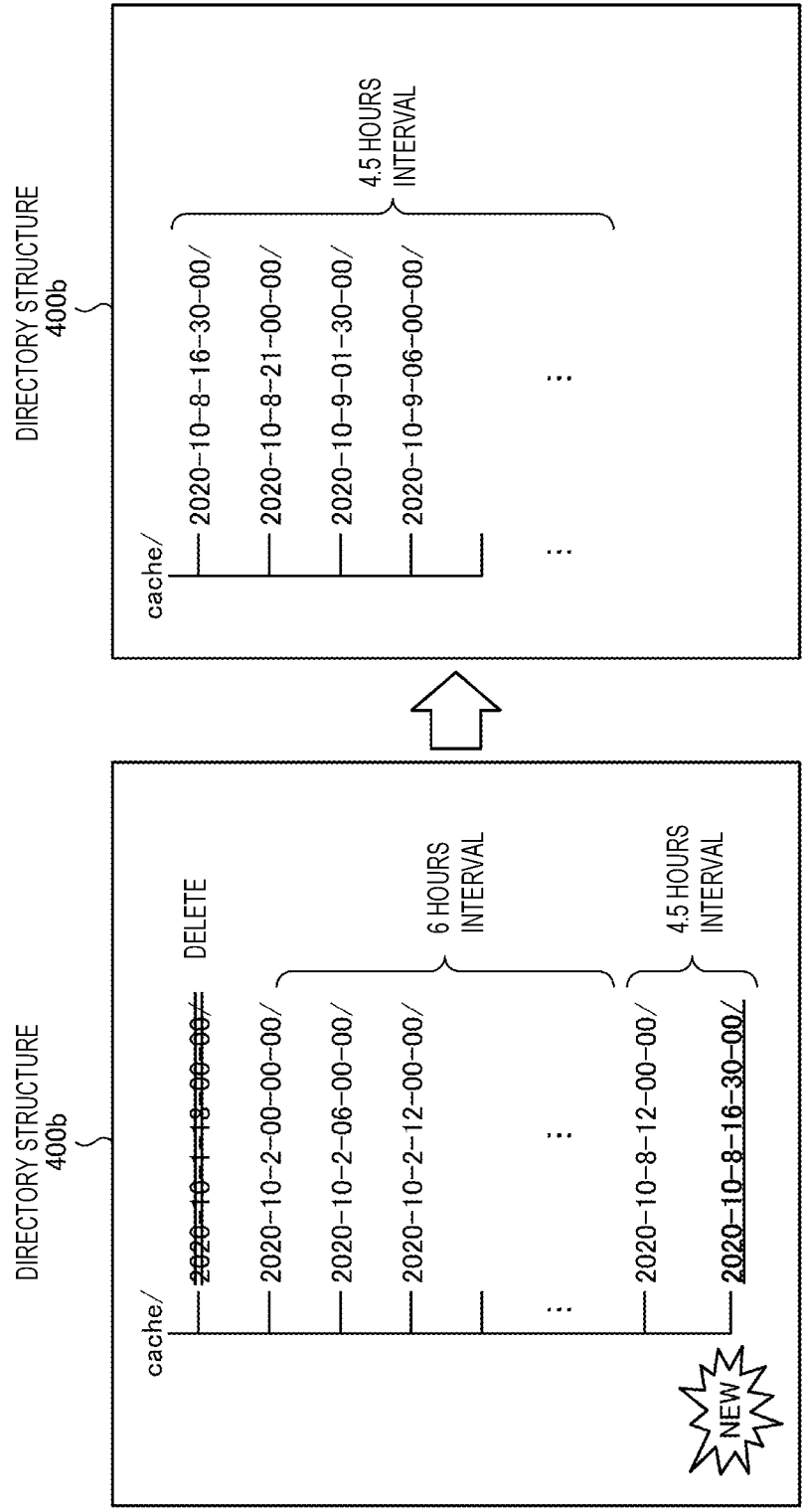
FIG. 29 is a schematic diagram illustrating a specific example of an operation of a zone controller in a modification of the third embodiment.

FIG. 29 is a schematic diagram illustrating a specific example of an operation of the zone controller 106b in a modification of the third embodiment. FIG. 29 illustrates a change of the directory structure 400b in a case where the unit period is shortened from "6 hours" to "4.5 hours".

After the unit period is shortened from "6 hours" to "4.5 hours", in generating a new directory, the zone controller 106b gives a name representing a time obtained by adding "4.5 hours" to the latest time among the times each of which is associated with any of the zones, to the corresponding new directory.

For example, when the directory structure 400b is placed in the state illustrated in FIG. 24, in a case where the unit period is shortened from "6 hours" to "4.5 hours", as illustrated on the left side of FIG. 29, the zone controller 106b deletes the directory with the name of "2020-10-1-18-00-00" representing the oldest time. Then, the zone controller 106b newly generates a directory given a name of "2020-10-8-16-30-00" representing "8 Oct. 2020 16:30:00" obtained by adding a new unit period (i.e., 4.5 hours) to "8 Oct. 2020 12:00:00" as the latest time.

Then, when newly generating a directory, the zone controller 106b gives a name representing a time obtained by adding "4.5 hours" to the latest time among the times associated with the zones, to the corresponding new directory. For example, as illustrated on the right side of FIG. 29, intervals of times given to directories are all "4.5 hours".

In this manner, when there is no available area in all zones created in the storage area 200b, the CPU 11 may shorten the unit period.

Shortening the unit period shortens the time interval of zone initialization. Thus, thereafter, even when the rate of writing of content into the SSD 15a is high, it is possible to prevent an available area from running out.

In the first to third embodiments and the modification of the third embodiment, a ZNS SSD is employed as an example of the storage device. The storage device, however, is not limited to the ZNS SSD. For example, instead of the ZNS SSD, a shingled magnetic recording (SMR)-type magnetic disk device may be employed as the storage device in the embodiments. The SMR type device has a higher recording density, and a larger storage capacity than a conventional magnetic recording (CMR) type device. That is, the adoption of the SMR-type magnetic disk device as the storage device may increase the storage capacity at a low cost as compared to the CMR-type magnetic disk device employed as the storage device.

In the first to third embodiments and the modification of the third embodiment, the CPU 11 is employed as an example of the processor. The processor is not limited to the CPU 11. For example, the processor may be implemented by a field-programmable gate array (FPGA), an application specific integrated circuit (ASIC), the CPU 11, or a combination thereof.

As described above, according to the above embodiments, the processor creates a plurality of zones in the storage area by controlling the storage device. When content requested by the terminal is stored in any of the zones, the processor reads the corresponding content from the storage device by controlling the storage device, and sends a response of the corresponding read content to the terminal. When the content requested by the terminal is not stored in any of the zones, the processor acquires the content requested by the terminal from the origin server, and sends a response of the acquired content to the terminal. The processor controls the storage device so as to write the acquired content into an available area in a writable zone among the zones. When a predetermined condition is satisfied, the processor selects one deletion target zone among the zones, and collectively deletes all contents in the deletion target zone.

Therefore, it is possible to obtain a cache server with a large storage capacity at low cost.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information processing apparatus comprising:
a network interface connectable to an origin server and a terminal via one or more networks;
a storage device, which is a zoned namespace (ZNS) solid state drive (SSD); and
a processor configured to:
assign a plurality of zones in the storage device, each of the zones being a contiguous physical address range of the storage device that is mapped to a contiguous logical address range and having a size greater than a unit size of data erasing in the storage device;
generate zone management information for each of the plurality of zones, the zone management information including a writable address, which is a smallest address from which data can be written and information as to whether the zone is a writable zone;
store content received from the origin server via the network interface, in one of writable zones and update the writable address of the zone management information for said one of the writable zones;
control the network interface to transmit the received content to the terminal; and
control the storage device to delete data stored therein in units of a zone upon a predetermined cache clearing criteria being met for one or more of the plurality of zones, deletion of the data stored in units of the zone comprising deleting entirety of each content stored in each zone subjected to the deletion.

2. The information processing apparatus according to claim 1, wherein the processor is configured to delete the zone management information of the one or more of the plurality of zones from which stored data is deleted.

3. The information processing apparatus according to claim 1, wherein the processor is configured to assign a new zone in the storage device when there is no writable zone.

4. The information processing apparatus according to claim 1, wherein the predetermined cache clearing criteria includes a condition that a total amount of data stored in the storage device exceeds a threshold.

5. The information processing apparatus according to claim 1, wherein
the zone management information includes a zone assigned time of the zone, and
the predetermined cache clearing criteria includes a condition that the zone has an oldest zone assigned time among the plurality of zones.

6. The information processing apparatus according to claim 1, wherein
the zone management information includes a read count of the zone, and
the predetermined cache clearing criteria includes a condition that the zone has a fewest read count among the plurality of zones.

7. The information processing apparatus according to claim 1, wherein
the zone management information includes a last read access time, and
the predetermined cache clearing criteria includes a condition that the zone has an oldest last read access time among the plurality of zones.

8. The information processing apparatus according to claim 1, wherein the processor is configured to:

determine a target zone for deletion;
determine one or more contents stored in the target zone to be saved based on a predetermined cache saving criteria; and
store the one or more contents in a writable zone.

9. The information processing apparatus according to claim 8, wherein
the processor is further configured to generate cache management information for each content, the cache management information including a read count of the content, and
the predetermined cache saving criteria includes a condition that a read count of the content is greater than a predetermined threshold.

10. The information processing apparatus according to claim 1, wherein the processor is configured to:
assign a first zone for contents associated with a first content feature and a second zone for contents associated with a second content feature; and
store the content received from the origin server in the first zone when the received content is associated with the first content feature and in the second zone when the received content is associated with the second content feature.

11. The information processing apparatus according to claim 10, wherein the first content feature includes a first content title, and the second content feature includes a second content title.

12. An information processing apparatus comprising:
a network interface connectable to an origin server and a terminal via one or more networks;
a storage device; and
a processor configured to:
assign a plurality of zones in the storage device, each of the zones being a contiguous physical address range of the storage device that is mapped to a contiguous logical address range and having a size greater than a unit size of data erasing in the storage device,
wherein assignment of the plurality of zone including assigning a first zone associated with a first future time and a second zone associated with a second future time before the first future time;
generate zone management information for each of the plurality of zones, the zone management information including a writable address, which is a smallest address from which data can be written and information as to whether the zone is a writable zone;
estimate an obsoletion time of content received from the origin server via the network interface;
store the received content in one of writable zones and update the writable address of the zone management information for said one of the writable zones,
wherein storing of the received content includes storing the received content in the first zone when the estimated obsoletion time is after the second future time and before the first future time, and in the second zone when the estimated obsoletion time is before the second future time;
control the network interface to transmit the received content to the terminal; and
control the storage device to delete data stored therein in units of a zone upon a predetermined cache clearing criteria being met for one or more of the plurality of zones.

13. The information processing apparatus according to claim 12, wherein a length of the first future time to an immediately following future time associated with another zone is equal to a length of the second future time to an immediately following future time associated with another zone.

14. The information processing apparatus according to claim 12, wherein
the predetermined cache clearing criteria is set for each of the plurality of zones, and
the predetermined cache clearing criteria for the first zone is the current time reaching the first future time, and the predetermined cache clearing criteria for the second zone is the current time reaching the second future time.

15. The information processing apparatus according to claim 14, wherein the processor is configured to:
dissociate the first zone from the first future time upon the current time reaching the first future time, and delete entire data cached in the first zone; and
associate the first zone with a new future time.

16. The information processing apparatus according to claim 15, wherein a length of the new future time to an immediately preceding future time associated with another zone is equal to a length of the first future time to the second future time.

17. The information processing apparatus according to claim 15, wherein a length of the new future time to an immediately preceding future time associated with another zone is less than a length of the first future time to the second future time.

18. The information processing apparatus according to claim 12, wherein the storage device is a zoned namespace (ZNS) solid state drive (SSD).

19. An information processing apparatus comprising:
a network interface connectable to an origin server and a terminal via one or more networks;
a storage device; and
a processor configured to:
assign a plurality of zones in the storage device, each of the zones being a contiguous physical address range of the storage device that is mapped to a contiguous logical address range and having a size greater than a unit size of data erasing in the storage device;
generate zone management information for each of the plurality of zones, the zone management information including a writable address, which is a smallest address from which data can be written, information as to whether the zone is a writable zone, and a zone assigned time of the zone;
store content received from the origin server via the network interface, in one of writable zones and update the writable address of the zone management information for said one of the writable zones;
control the network interface to transmit the received content to the terminal; and
control the storage device to delete data stored therein in units of a zone upon a predetermined cache clearing criteria being met for one or more of the plurality of zones, the predetermined cache clearing criteria including a condition that the zone has an oldest zone assigned time among the plurality of zones.

20. The information processing apparatus according to claim 19, wherein the storage device is a zoned namespace (ZNS) solid state drive (SSD).

* * * * *